United States Patent
Beistline et al.

(10) Patent No.: US 7,070,846 B2
(45) Date of Patent: *Jul. 4, 2006

(54) CARPET CONSTRUCTIONS, SYSTEMS, AND METHODS

(75) Inventors: Robin R. Beistline, LaGrange, GA (US); Eric A. Dunkelberg, Newnan, GA (US); Jonathan C. McCay, LaGrange, GA (US); Lisa R. Bailey, Sharpsburg, GA (US); Richard W. Stoyles, LaGrange, GA (US); Lou H. Webster, LaGrange, GA (US); John K. Gurr, Roanoke, AL (US)

(73) Assignee: Milliken & Company, Spartanburg, SC (US)

( * ) Notice: Subject to any disclaimer, the term of this patent is extended or adjusted under 35 U.S.C. 154(b) by 218 days.

This patent is subject to a terminal disclaimer.

(21) Appl. No.: 10/167,185

(22) Filed: Jun. 11, 2002

(65) Prior Publication Data

US 2003/0207071 A1 Nov. 6, 2003

Related U.S. Application Data

(63) Continuation-in-part of application No. 10/138,837, filed on May 3, 2002.

(51) Int. Cl.
*B32B 33/00* (2006.01)
*B32B 3/02* (2006.01)

(52) U.S. Cl. .......................................... 428/88; 428/89

(58) Field of Classification Search .................. 428/88, 428/89; 8/929; 700/130, 131, 133; 347/15, 347/43, 100, 105, 107

See application file for complete search history.

(56) References Cited

U.S. PATENT DOCUMENTS

| 4,116,626 A | 9/1978 | Varner ........................... 8/149 |
| 4,446,974 A | * 5/1984 | Ott ................................ 211/45 |
| 4,635,078 A | 1/1987 | Sakurada et al. ........... 346/140 |

FOREIGN PATENT DOCUMENTS

| EP | 449411 A1 | * 10/1991 |
| JP | 11265435 A | * 9/1999 |
| WO | WO 9844448 A1 | * 10/1998 |

OTHER PUBLICATIONS

HFD Textiles Report, "Giant Steps", pp. 41, 42, Dated Jun. 15, 1992.

(Continued)

*Primary Examiner*—Cheryl A. Juska
(74) *Attorney, Agent, or Firm*—Terry T. Moyer; Daniel R. Alexander

(57) ABSTRACT

A textile substrate such as patterned carpet for coordinating with other flooring is provided. The substrate includes a multi-colored pattern produced by a process for coloring substrates, using the application of liquid colorants, in which the assignment of color is done on a pixel-by-pixel basis, and corresponding products. Relatively large areas of a substrate may be given the appearance of being uniformly colored by successively replicating or tiling a group of individually colored pixels comprising a repeating unit (i.e., a superpixel) across the substrate surface. The repeating unit is constructed in such a way that if a colorant application error develops, causing one or more pixels within the repeating unit to be colored incorrectly or incompletely, the overall arrangement of the pixels within the repeating unit will render such error less visually apparent when viewed on the substrate. A display rug having a plurality of areas of different patterns, colors or shades is provided. Also, a display rug and a display cover is provided.

13 Claims, 46 Drawing Sheets

(11 of 46 Drawing Sheet(s) Filed in Color)

U.S. PATENT DOCUMENTS

| | | | | |
|---|---|---|---|---|
| 4,849,768 A | * | 7/1989 | Graham | 347/14 |
| 5,035,018 A | * | 7/1991 | Robbins et al. | 8/150 |
| 5,136,520 A | | 8/1992 | Cox | 364/470 |
| 5,142,481 A | * | 8/1992 | Cox | 700/133 |
| 5,179,749 A | * | 1/1993 | Magee | 8/150 |
| 5,208,592 A | | 5/1993 | Johnson, Jr. | 341/63 |
| 5,228,161 A | * | 7/1993 | Scatizzi | 8/151 |
| 5,316,128 A | * | 5/1994 | Long | 198/530 |
| 5,428,720 A | | 6/1995 | Adams, Jr. | 395/131 |
| 5,805,178 A | | 9/1998 | Silverbrook | 347/15 |
| 5,959,632 A | * | 9/1999 | Hashimoto et al. | 345/588 |
| 6,062,137 A | | 5/2000 | Guo et al. | 101/171 |
| 6,181,816 B1 | * | 1/2001 | Adams et al. | 382/162 |
| 6,509,979 B1 | * | 1/2003 | Magee | 358/1.9 |
| 6,793,309 B1 | | 9/2004 | McCay et al. | 347/15 |
| 2001/0012109 A1 | * | 8/2001 | Magee | 358/1.9 |
| 2002/0034607 A1 | * | 3/2002 | Stoyles | 428/95 |
| 2002/0162176 A1 | * | 11/2002 | Kobayashi et al. | 8/149 |
| 2002/0172796 A1 | * | 11/2002 | Magee et al. | 428/85 |
| 2002/0175942 A1 | * | 11/2002 | Seitz, Jr. | 345/764 |
| 2002/0197586 A1 | * | 12/2002 | Worth | 434/75 |
| 2003/0004695 A1 | * | 1/2003 | Magee et al. | 703/6 |
| 2003/0058250 A1 | * | 3/2003 | Adams et al. | 345/589 |
| 2003/0060918 A1 | * | 3/2003 | West et al. | 700/133 |
| 2003/0139840 A1 | * | 7/2003 | Magee et al. | 700/133 |

OTHER PUBLICATIONS

Geusebroek et al., Color Invariance, ISIS Technical Report Series, Nov. 2000, vol. 20, pp. 1–2.

Emmel et al., A Model For Colour Prediction of Halftoned Samples Incorporating Light Scattering and Ink Spreading, Proceedings of the $7^{th}$ IS&T/SID Color Imaging Conference, Nov. 1999, pp. 1–9, especially pp. 1–4.

Emmel et al., A Unified Model for Color Prediction of Halftoned Prints, Journal of Imaging Science and Technology, Jul. 2000, vol. 44, No. 4, pp. 351–359, and p. 385, especially pp. 351–354.

* cited by examiner

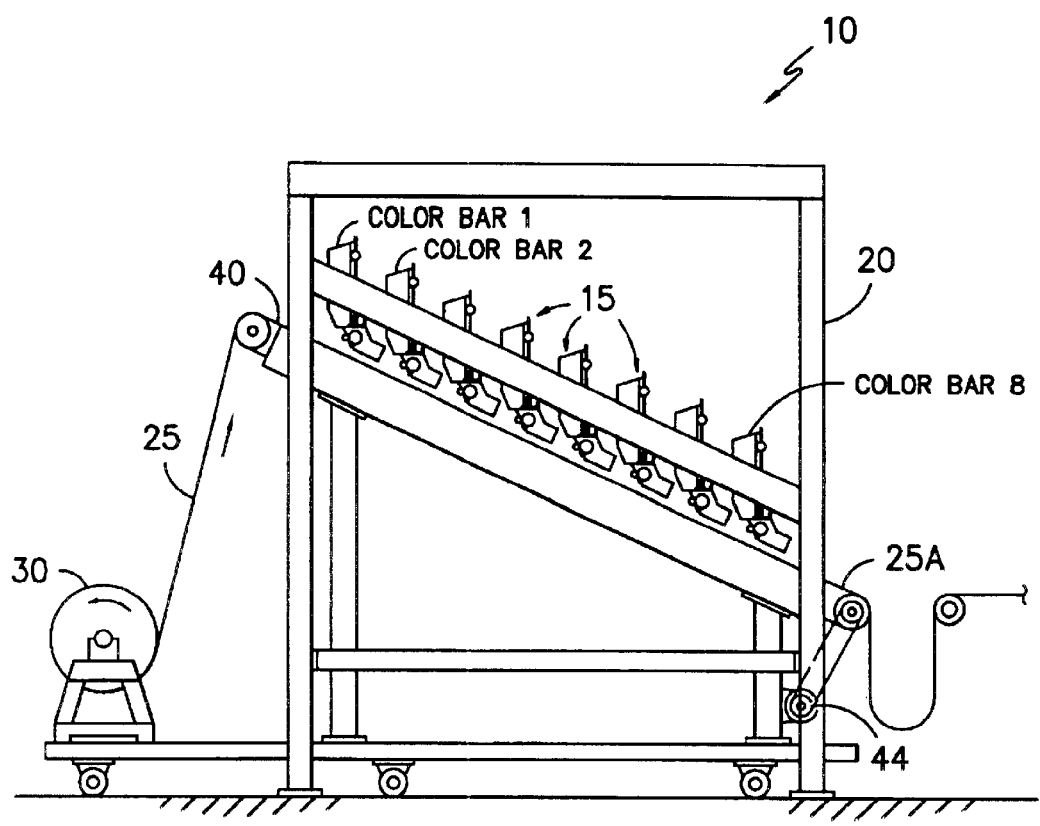
FIG. —1—

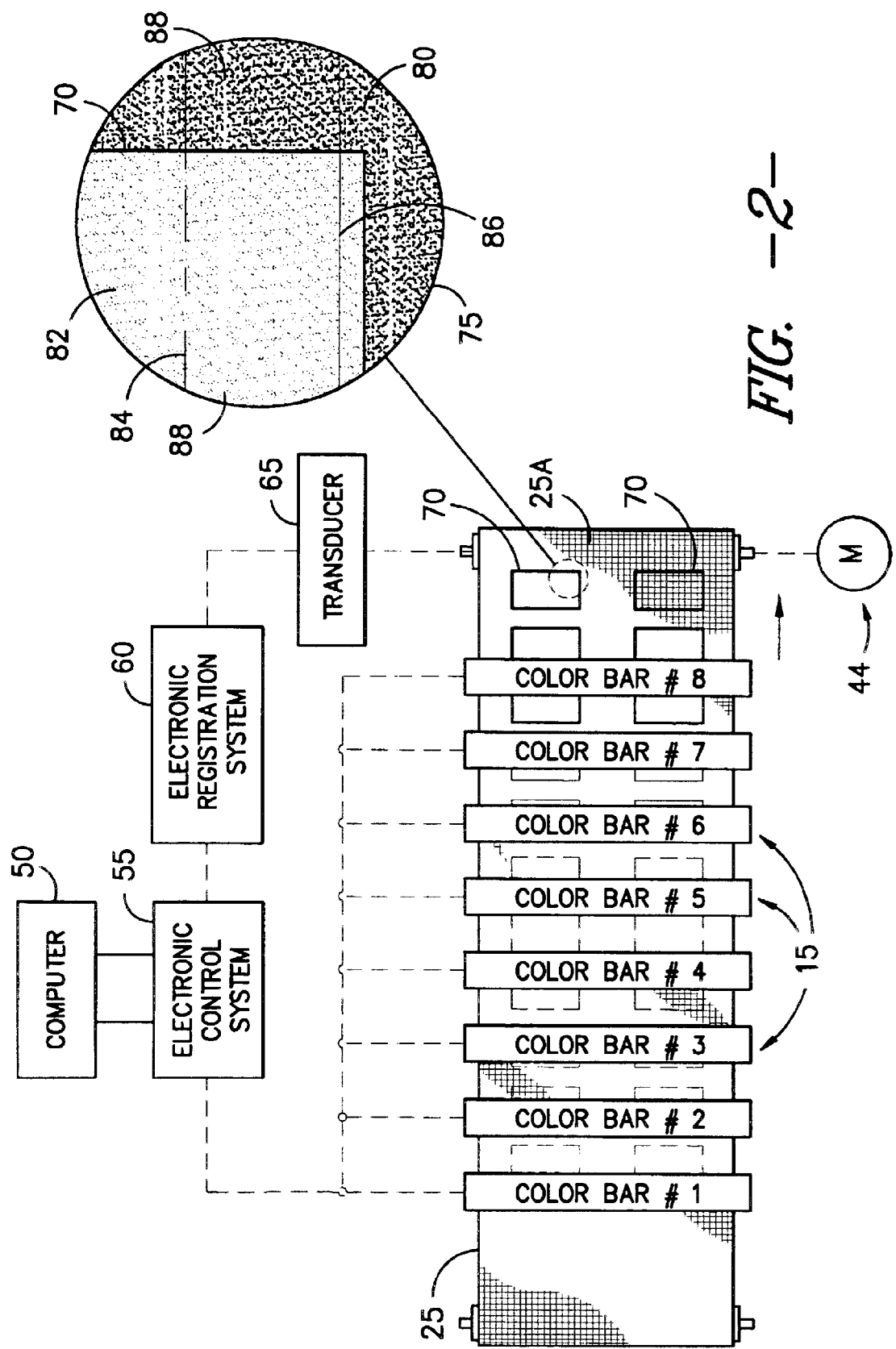
FIG. -2-

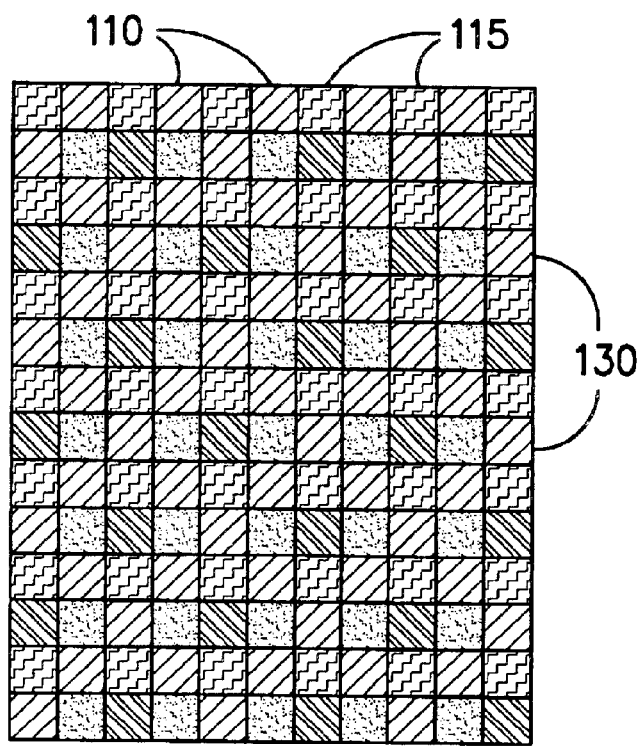
FIG. —3A—

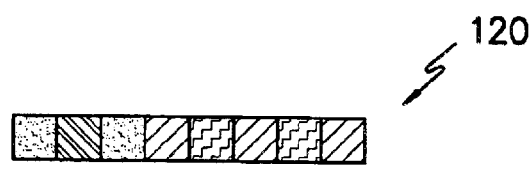
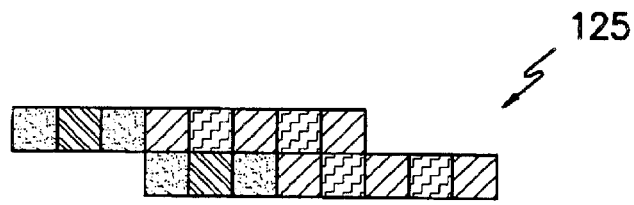
FIG. —3B—
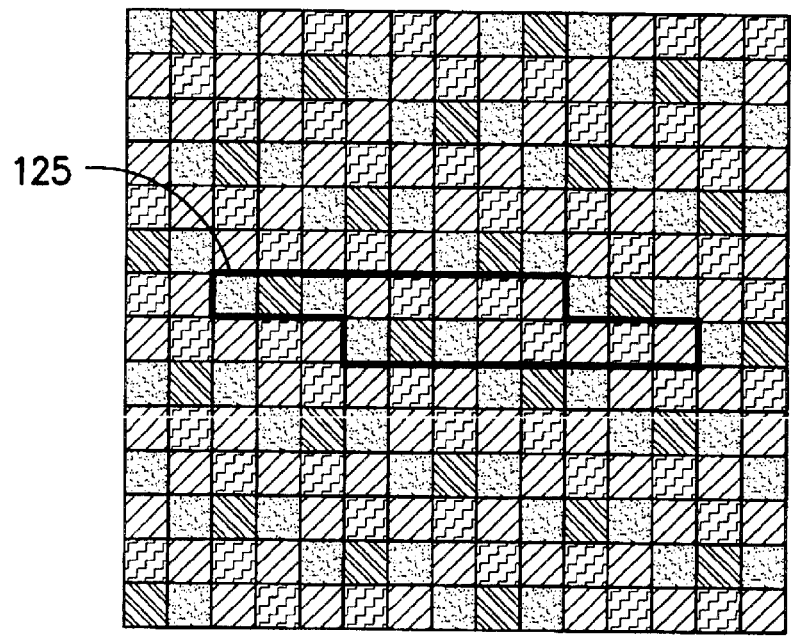
FIG. —3C—
FIG. —3D—

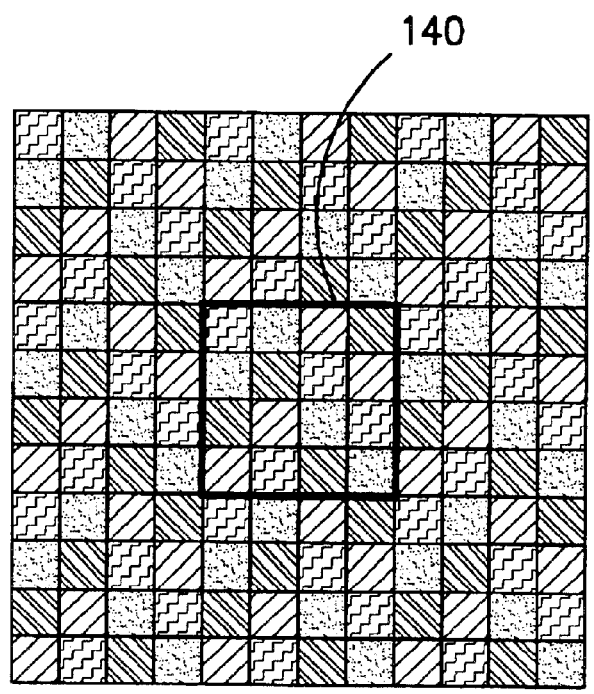
FIG. —4—

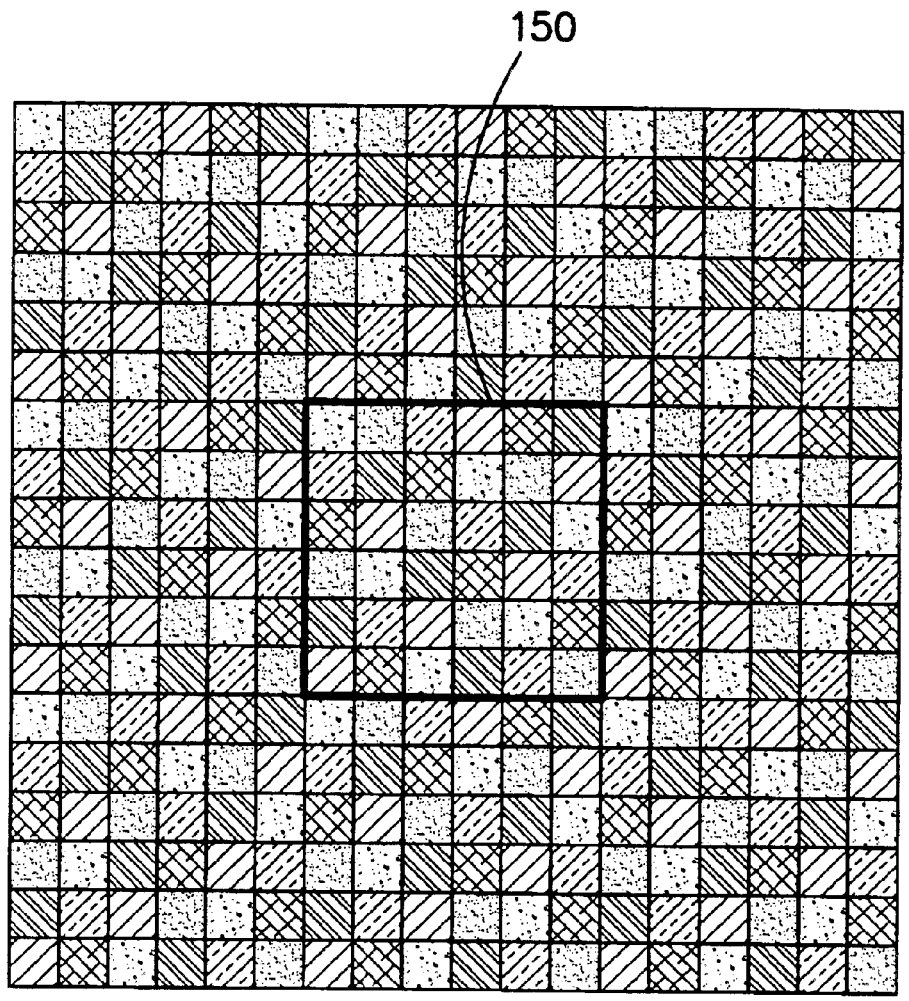
 = COLOR 1     = COLOR 4
 = COLOR 2     = COLOR 5
 = COLOR 3     = COLOR 6
FIG. —5—

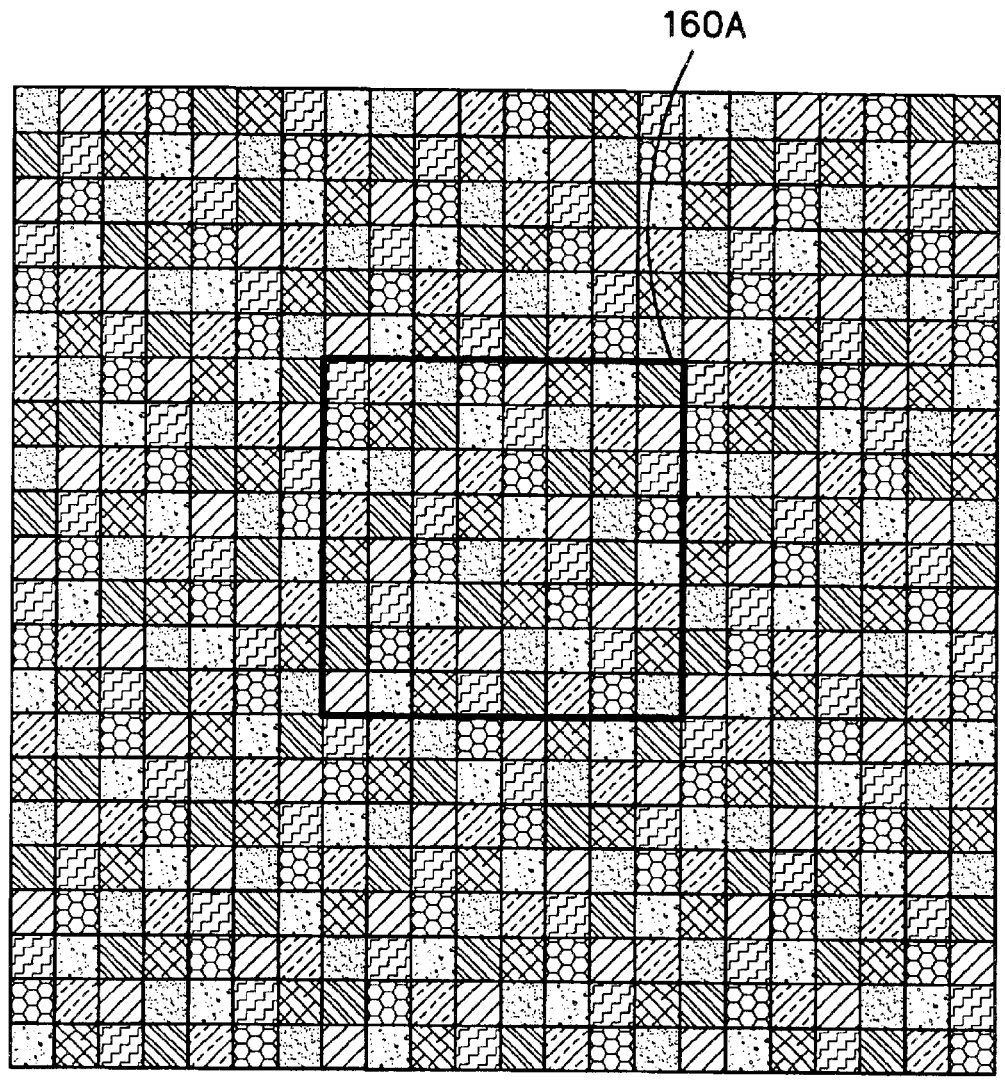
FIG. —6A—

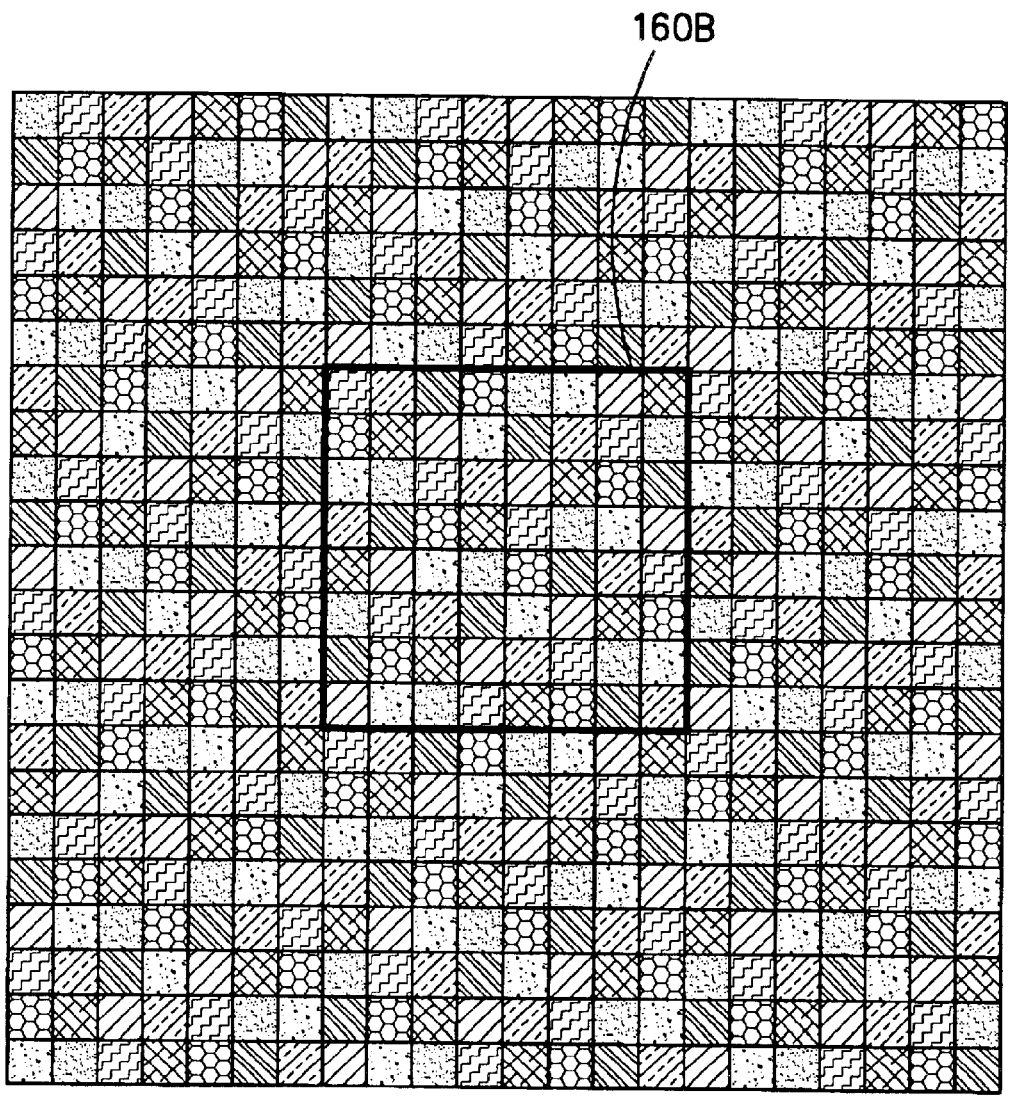
FIG. —6B—

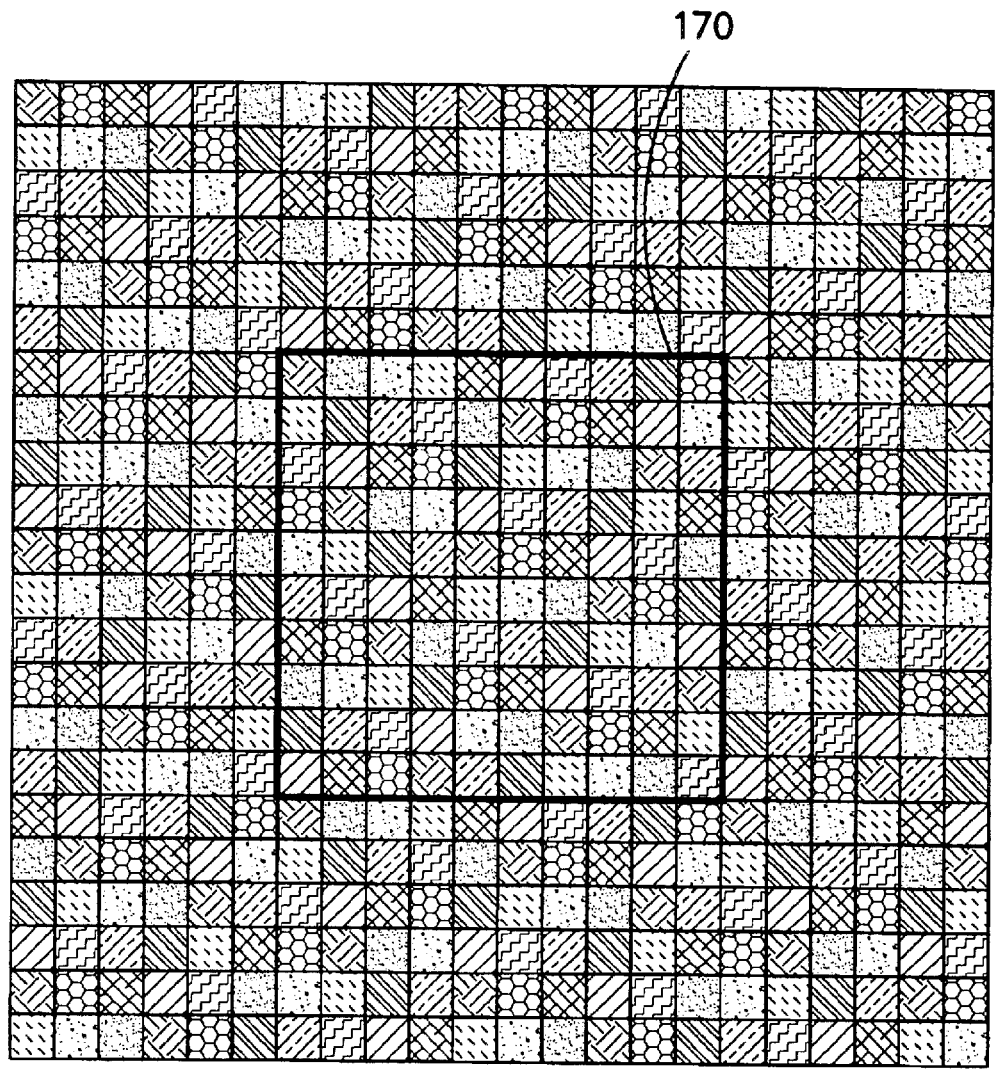
| | | | |
|---|---|---|---|
| ▨ = COLOR 1 | | ▒ = COLOR 6 | |
| ▨ = COLOR 2 | | ▨ = COLOR 7 | |
| ▨ = COLOR 3 | | ▨ = COLOR 8 | |
| ▨ = COLOR 4 | | ▨ = COLOR 9 | |
| ▨ = COLOR 5 | | ▨ = COLOR 10 | |
*FIG. —7—*

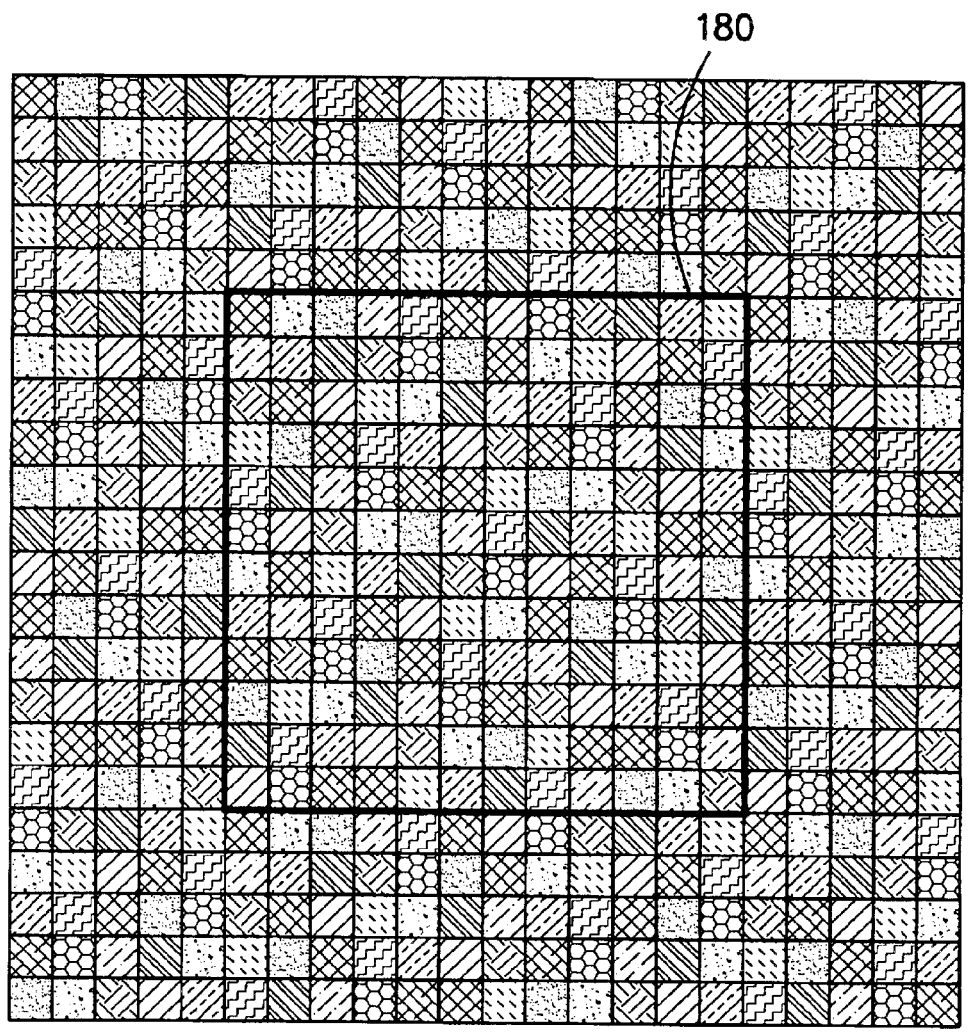
| | | | | |
|---|---|---|---|---|
| ▨ | = COLOR 1 | | ⬡ | = COLOR 7 |
| ▨ | = COLOR 2 | | ▨ | = COLOR 8 |
| ▨ | = COLOR 3 | | ▨ | = COLOR 9 |
| ▨ | = COLOR 4 | | ▨ | = COLOR 10 |
| ▨ | = COLOR 5 | | ▨ | = COLOR 11 |
| ▨ | = COLOR 6 | | ▨ | = COLOR 12 |
FIG. —8—

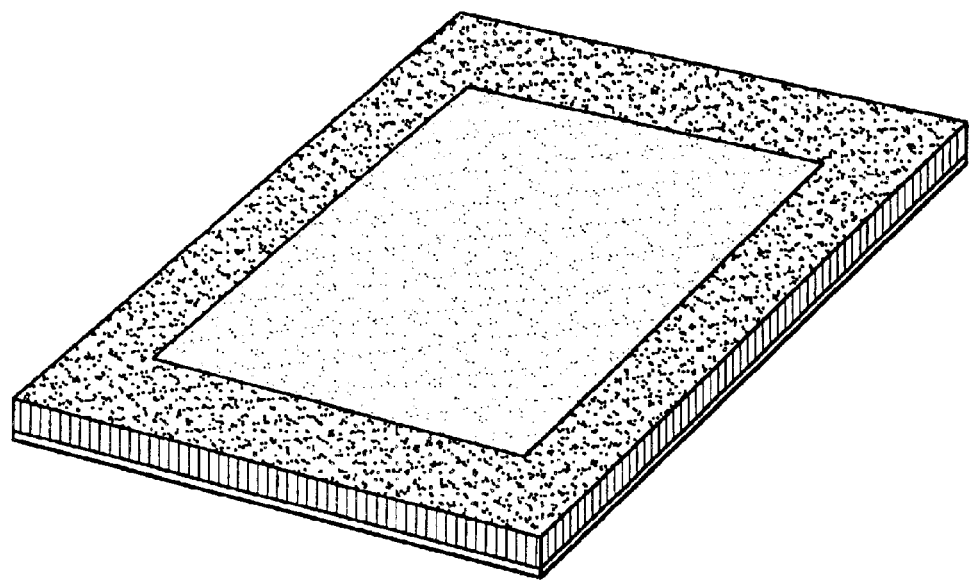
FIG. -9-
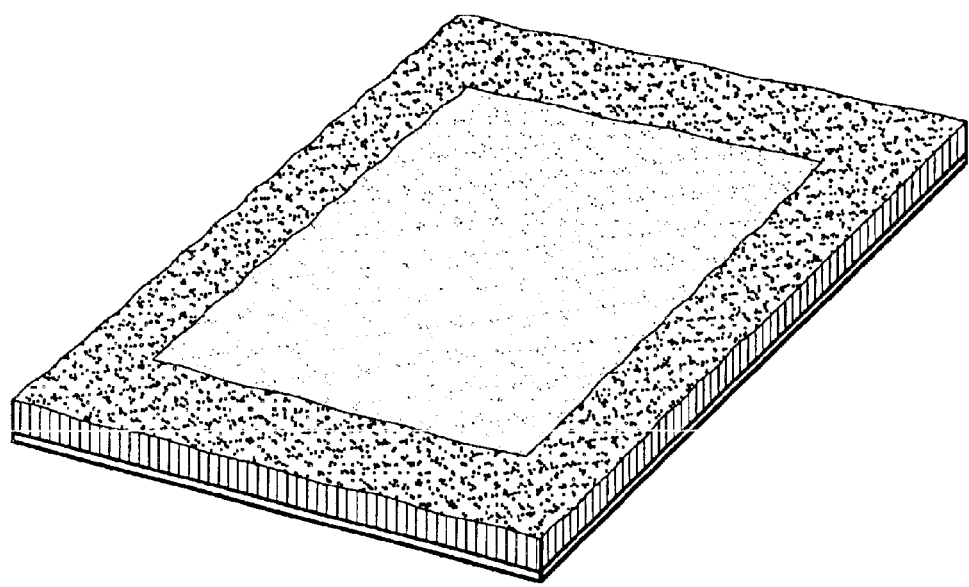
FIG. -10-

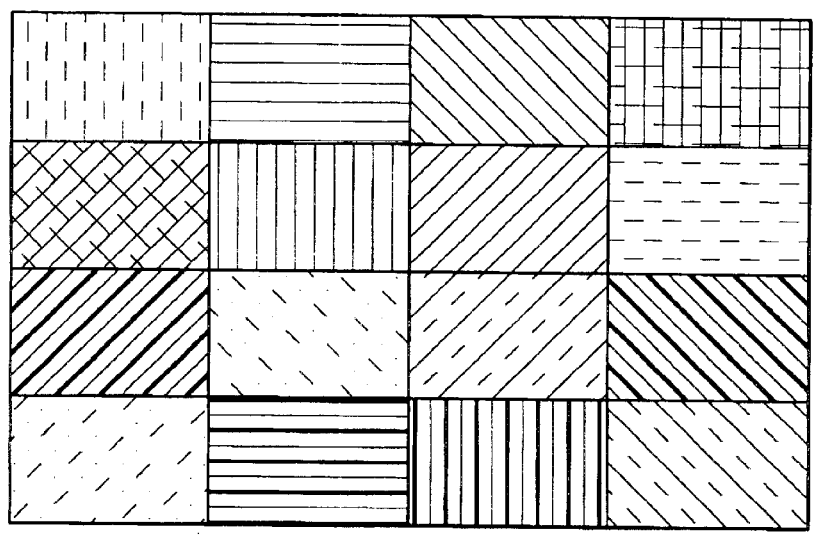
FIG. —11A—

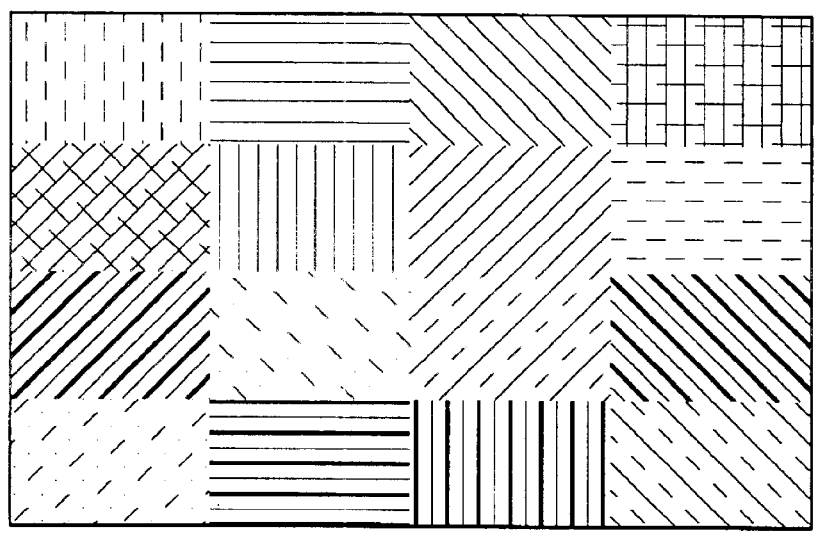
FIG. −11B−

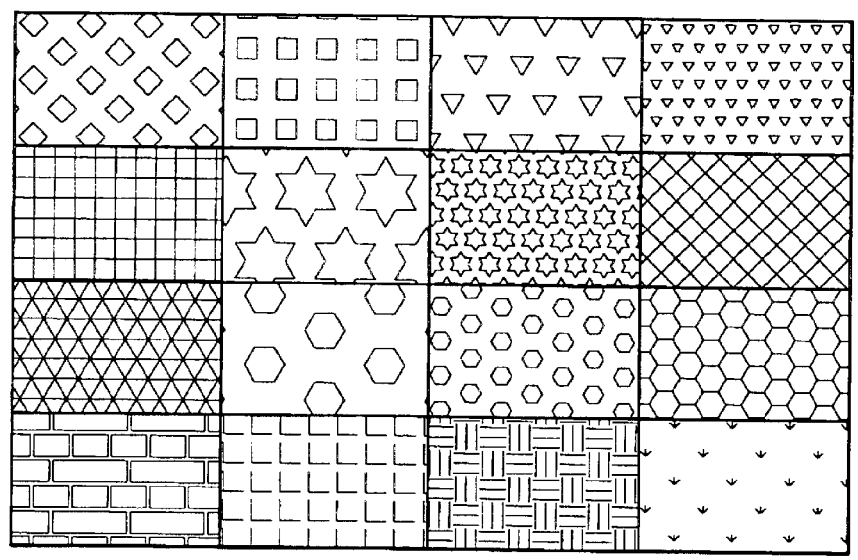
FIG. −12A−

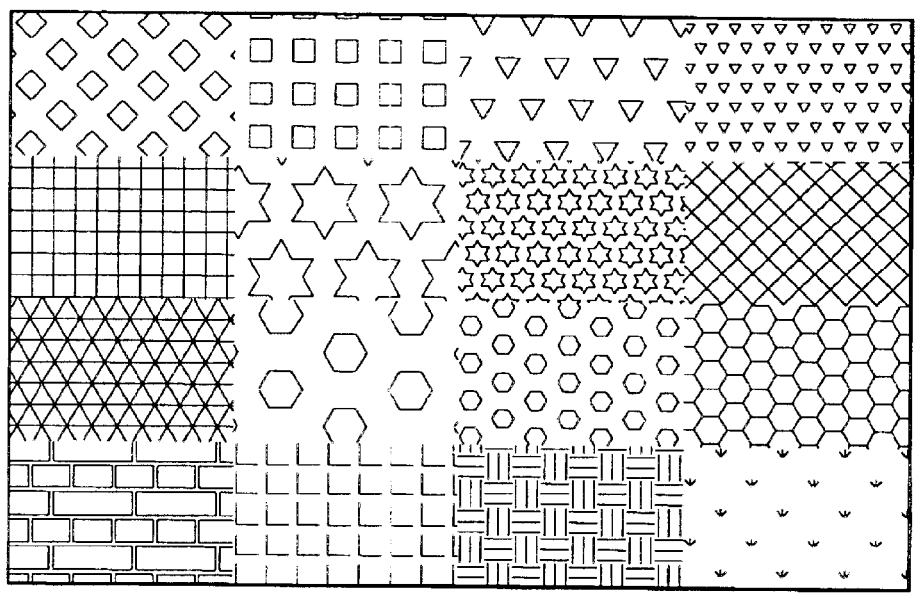
FIG. -12B-

| LR1 | MR1 | R1 | DR1 |
|-----|-----|----|-----|
| LR2 | MR2 | R2 | DR2 |
| LR3 | MR3 | R3 | DR3 |
| LR4 | MR4 | R4 | DR4 |

*FIG. —13—*

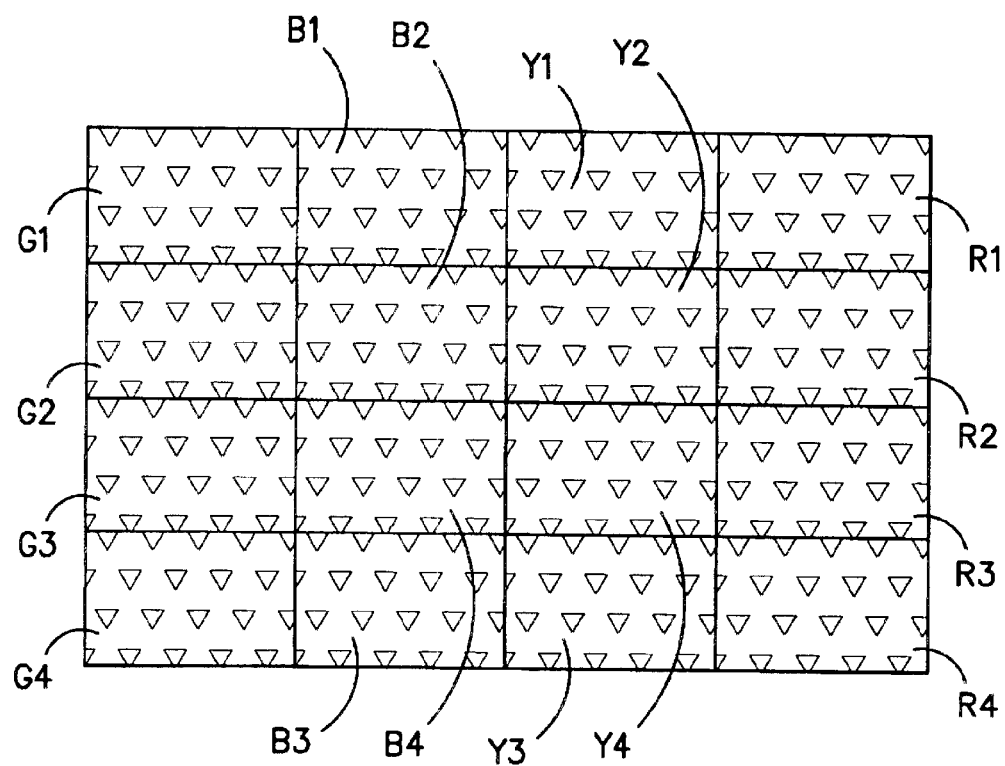
FIG. -14-

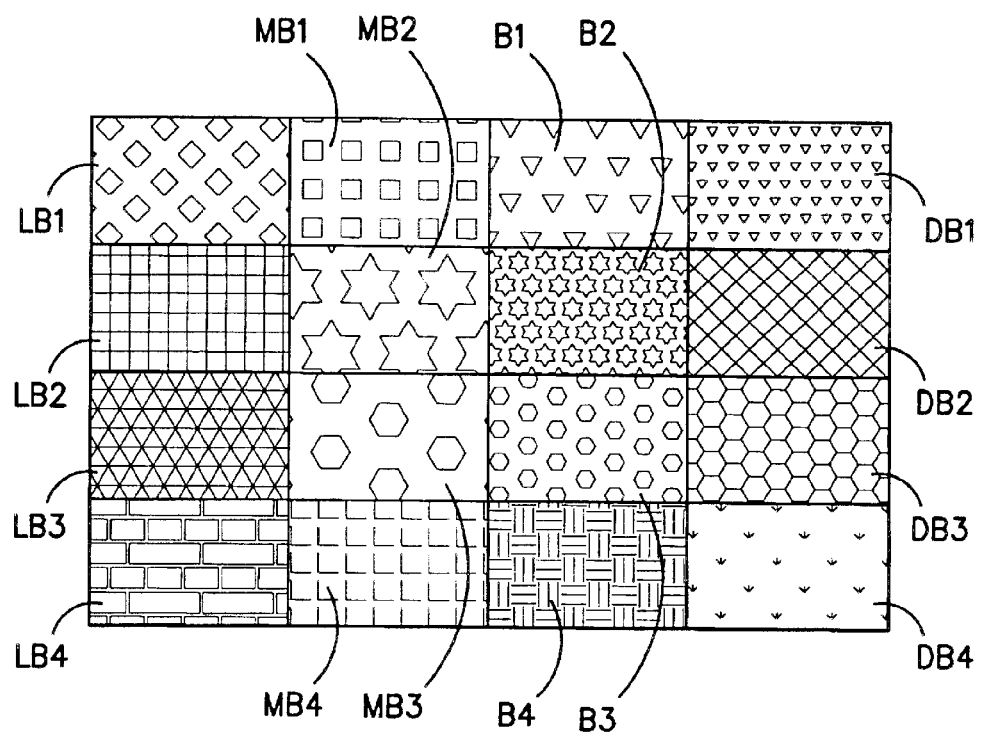
FIG. -15-

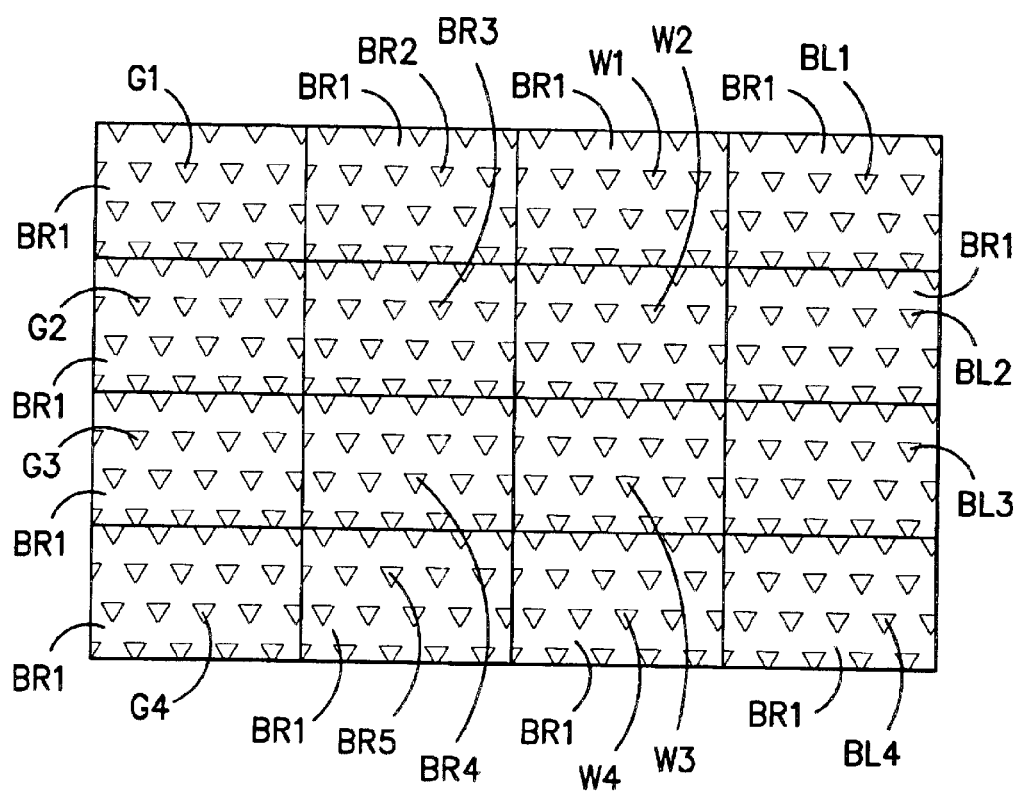
FIG. -16-

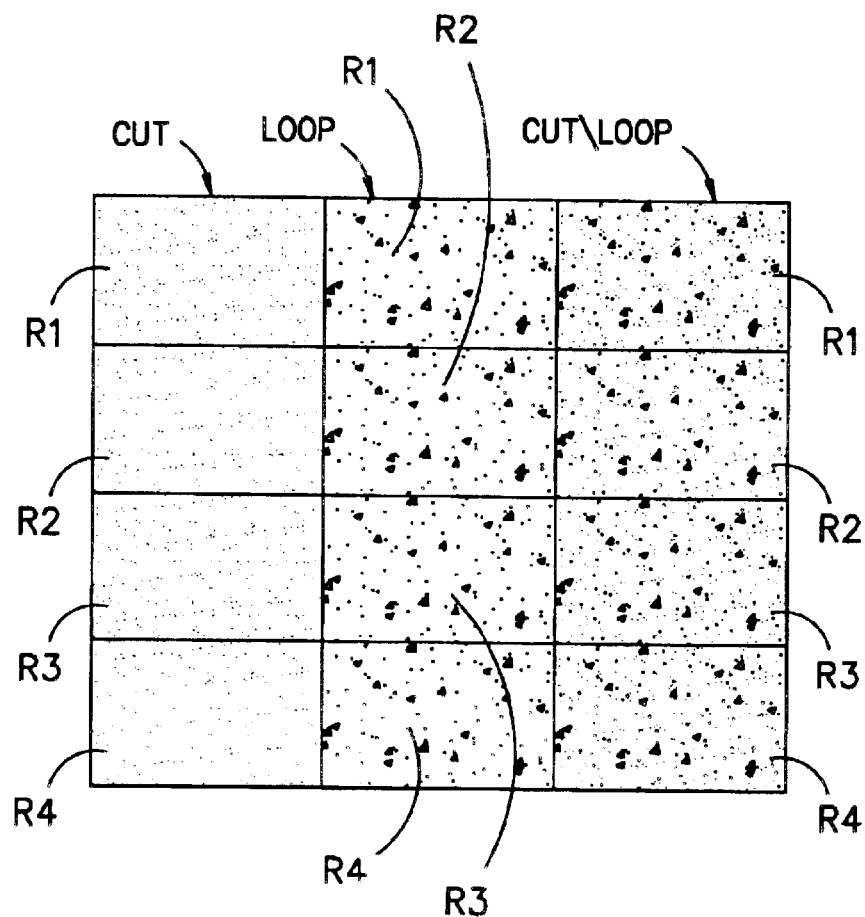
FIG. -17-

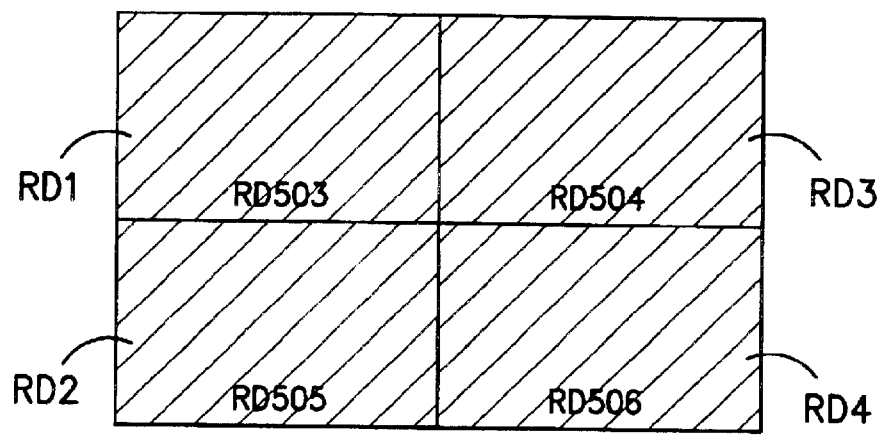
FIG. -18-

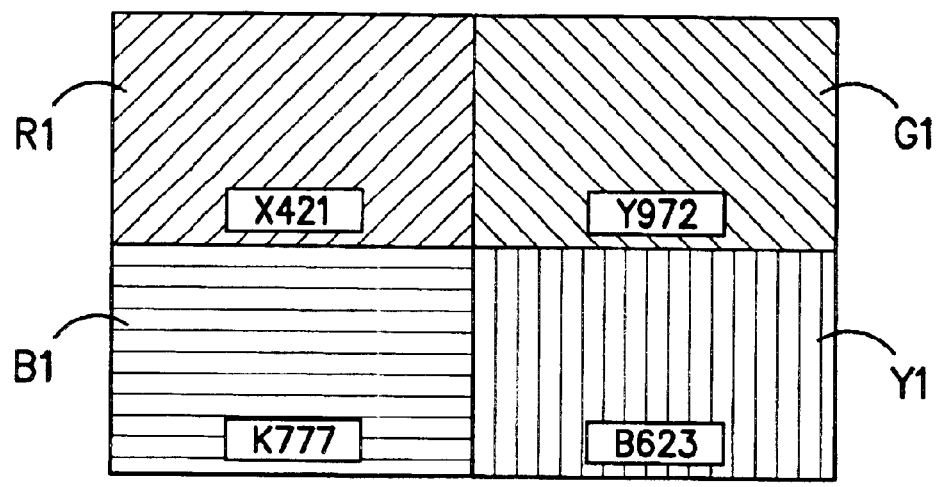
FIG. —19—

FIG. -20-

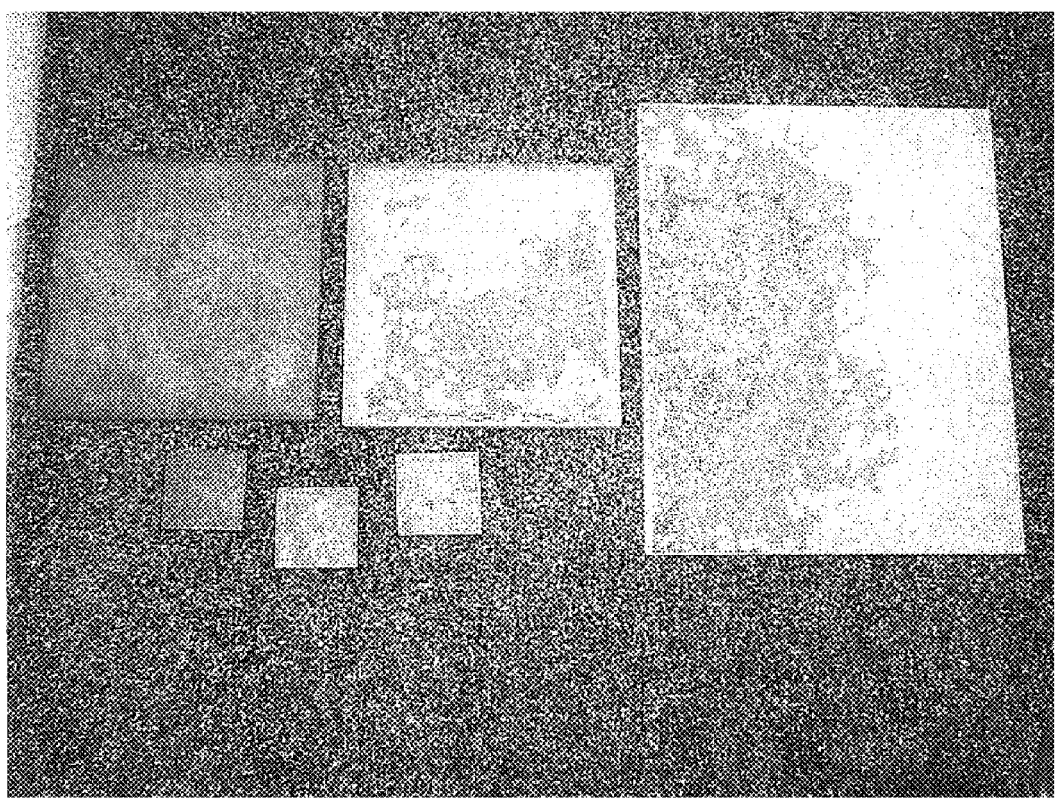
FIG. -21-

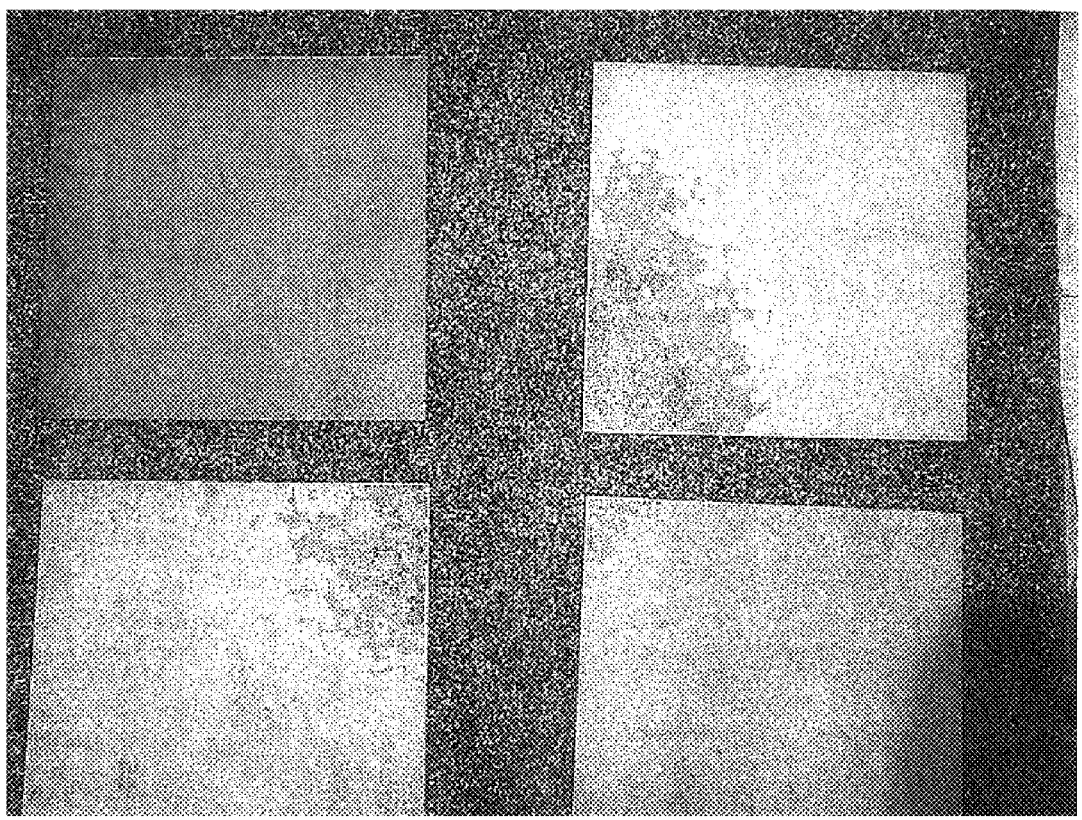
FIG. -22-

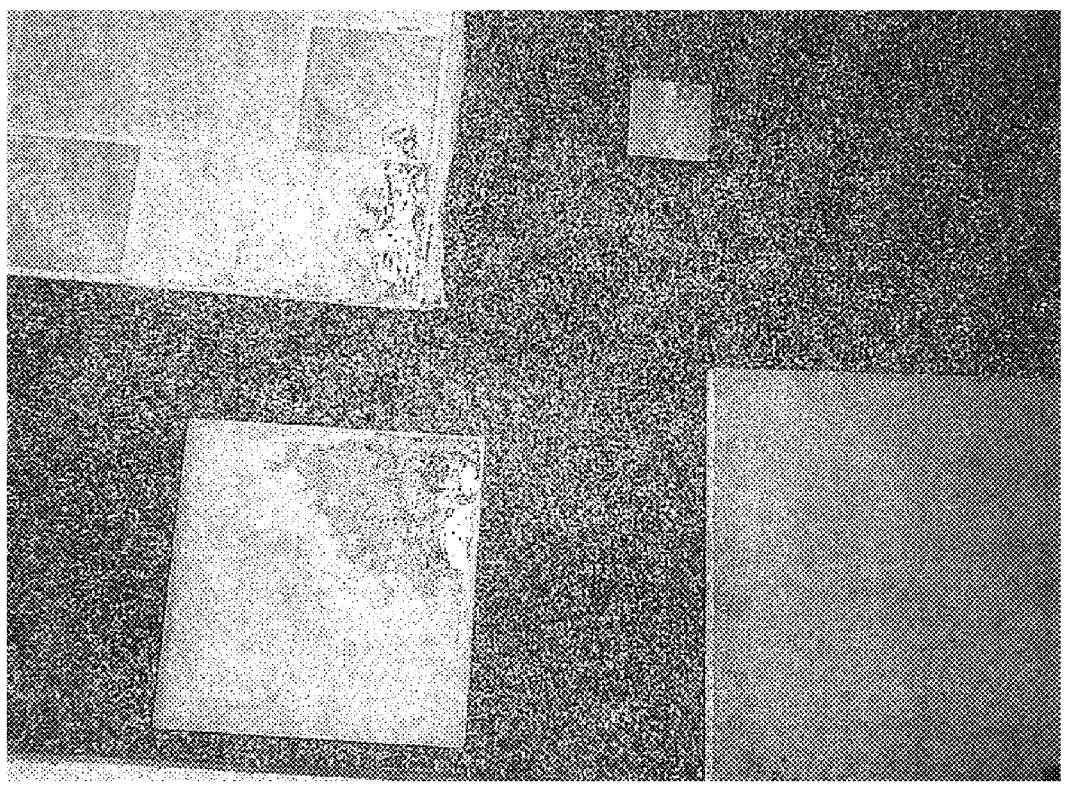
FIG. -23-

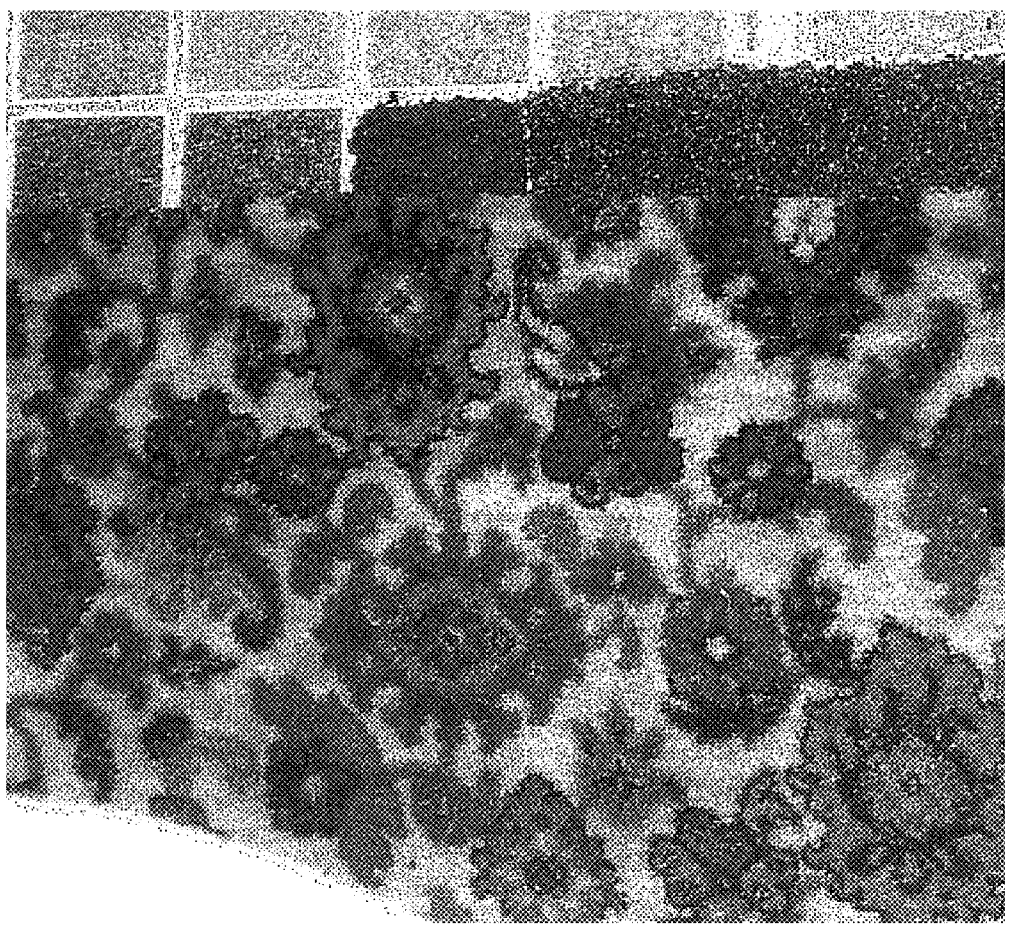
FIG. -24-

FIG. -25-

FIG. -26-

FIG. -27-

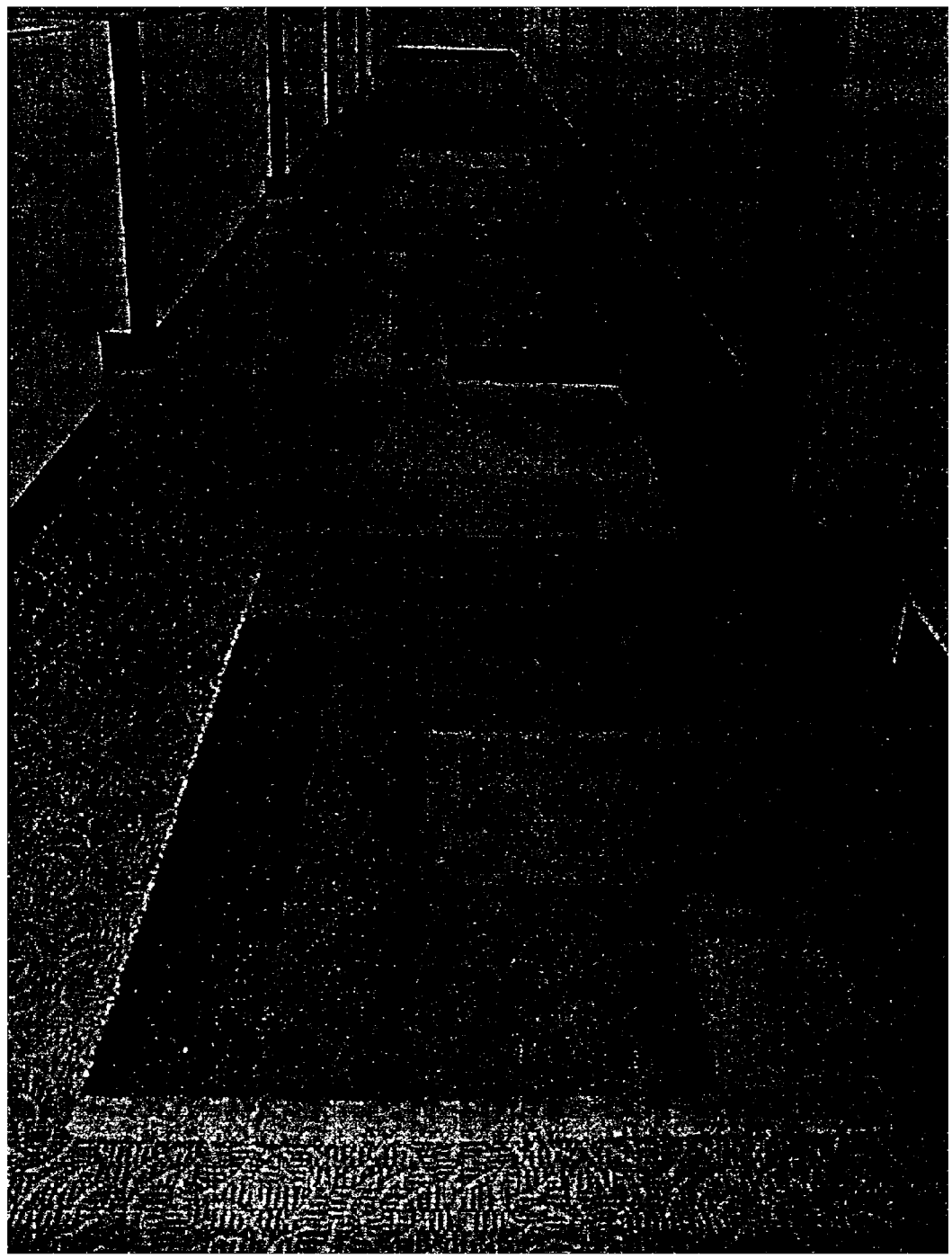
FIG. -28-

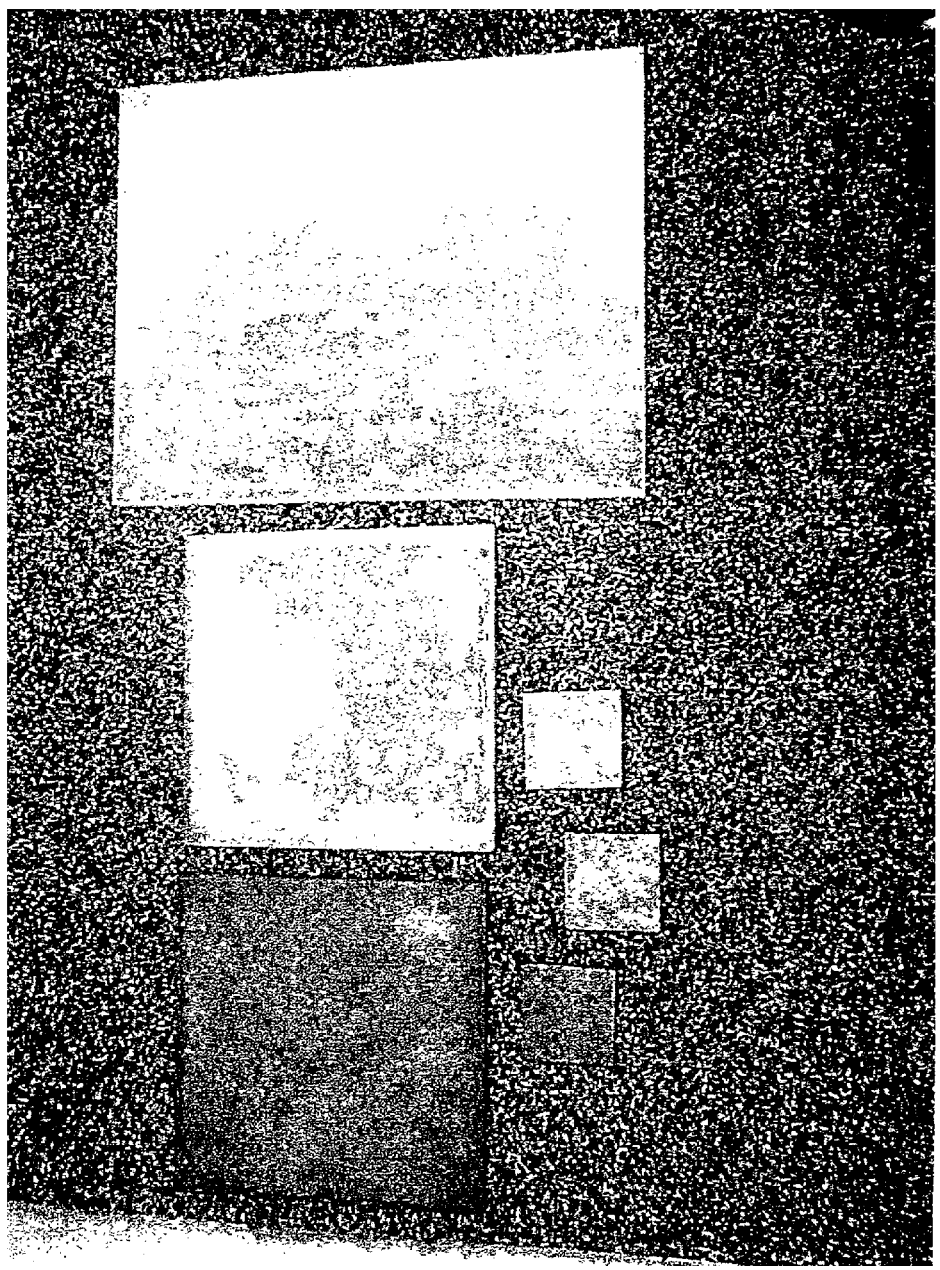
FIG. −29−

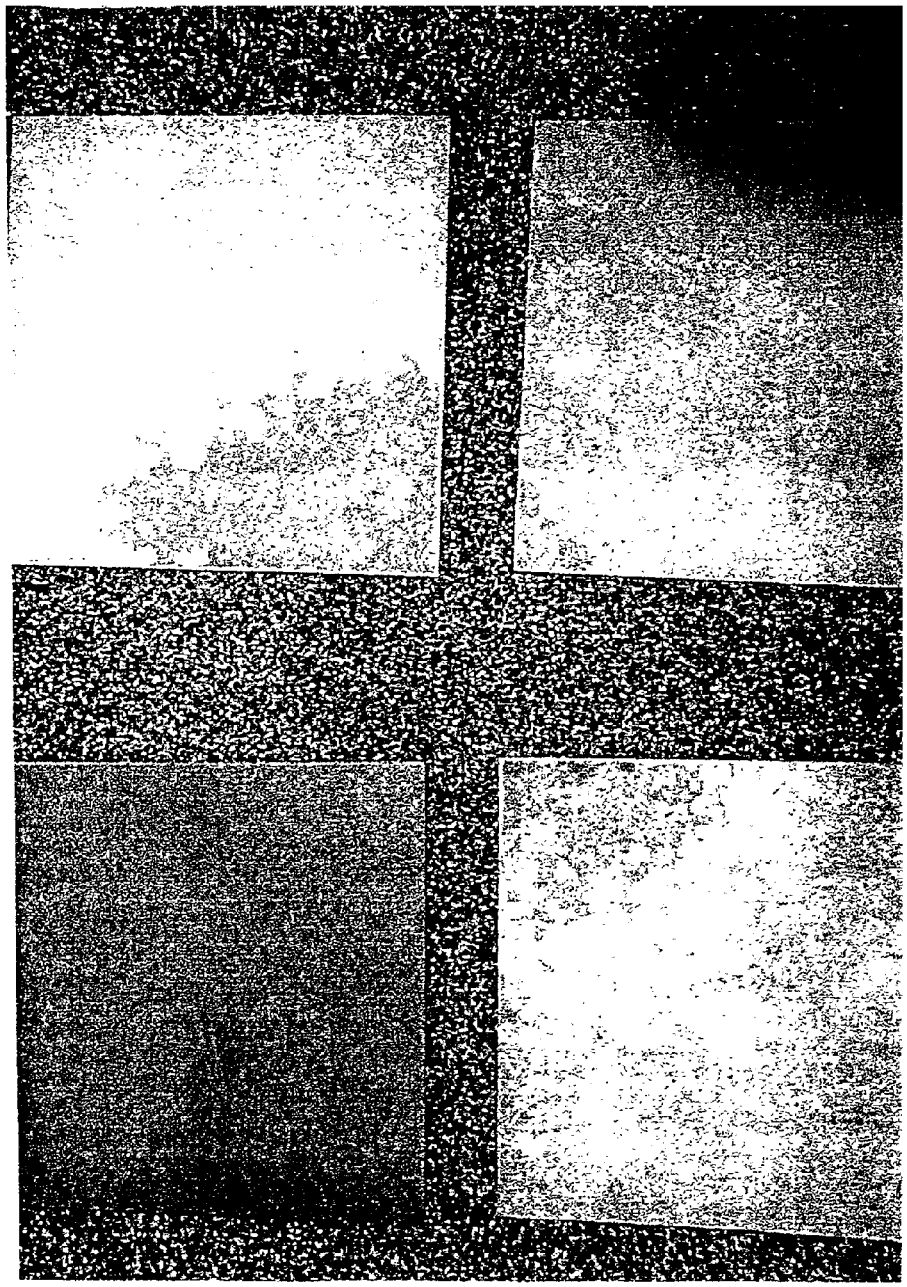
FIG. -30-

FIG. -31-

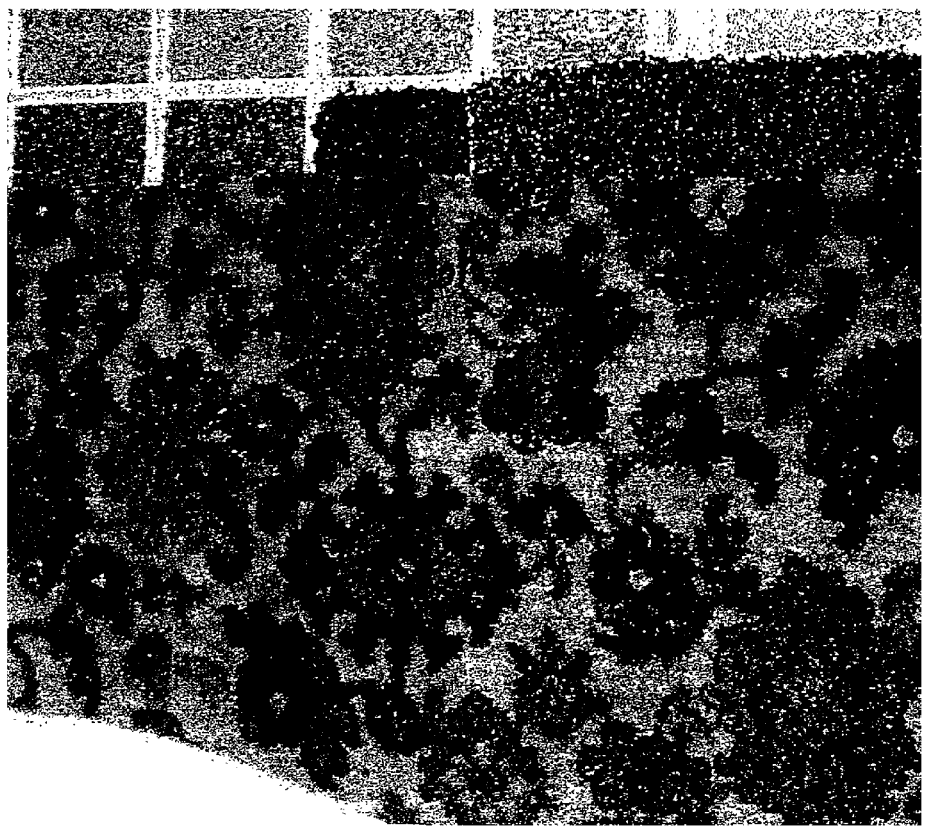
FIG. -32-

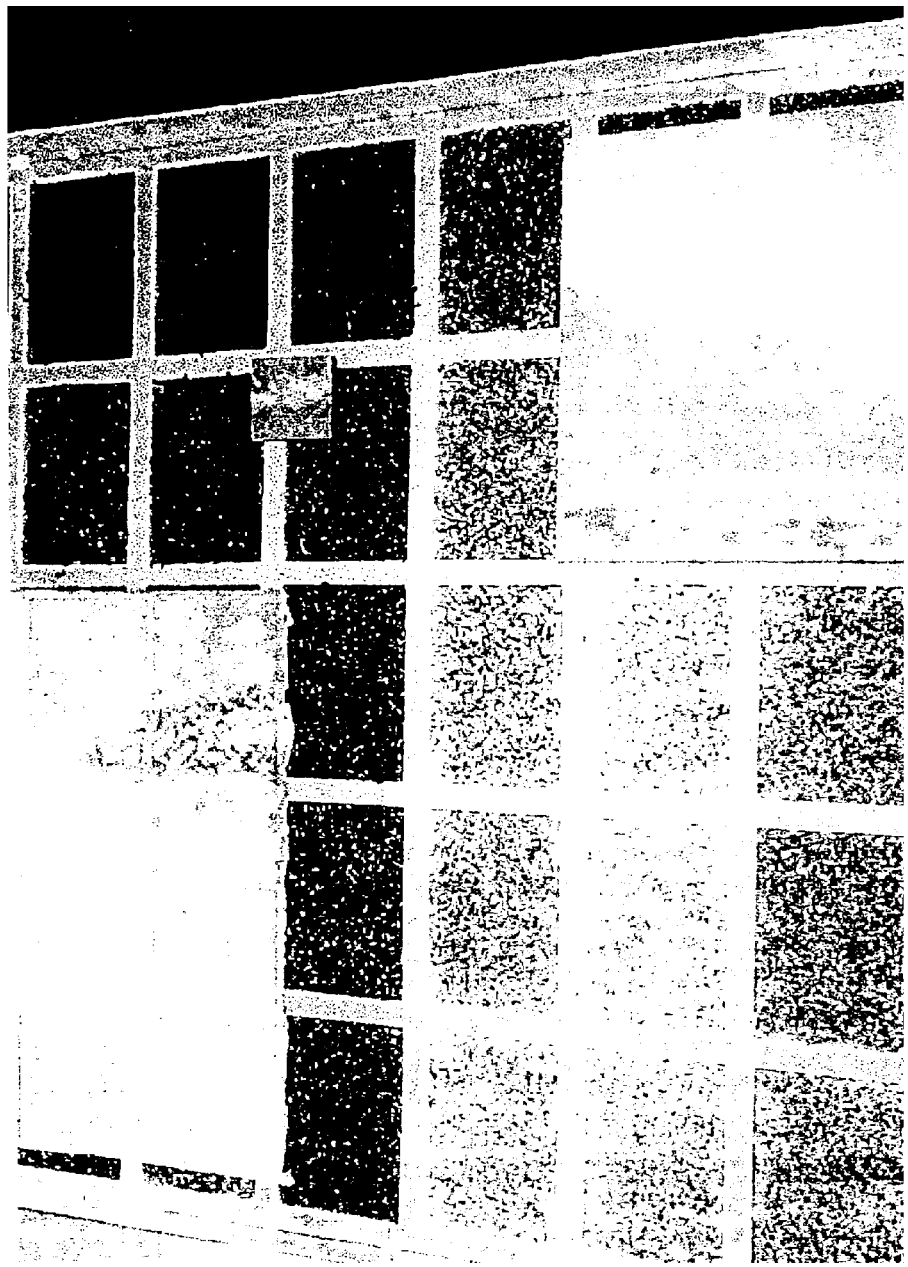
FIG. -33-

FIG. -34-

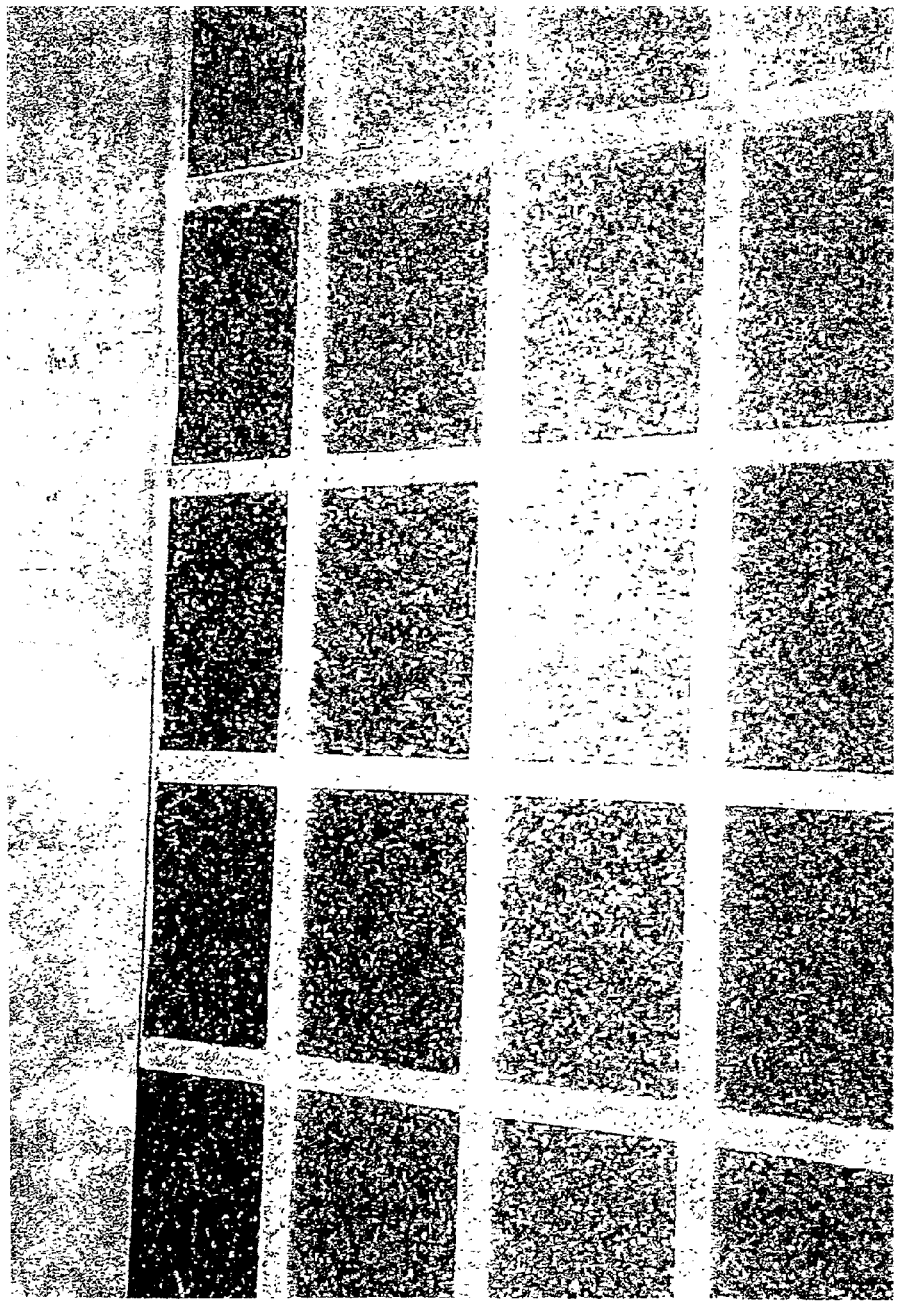
FIG. -35-

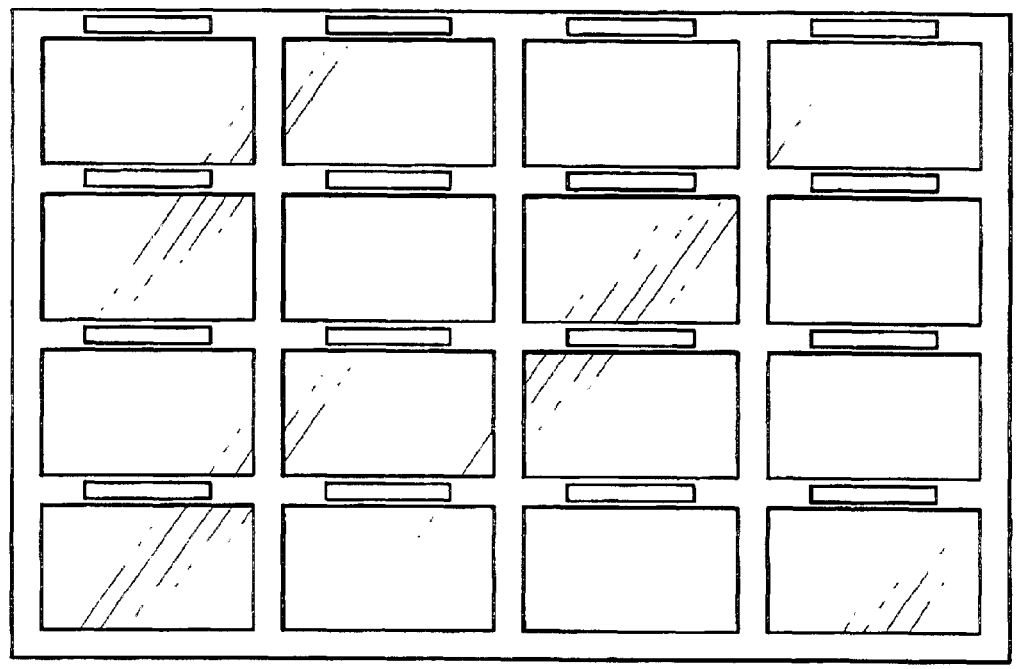
FIG. -36-
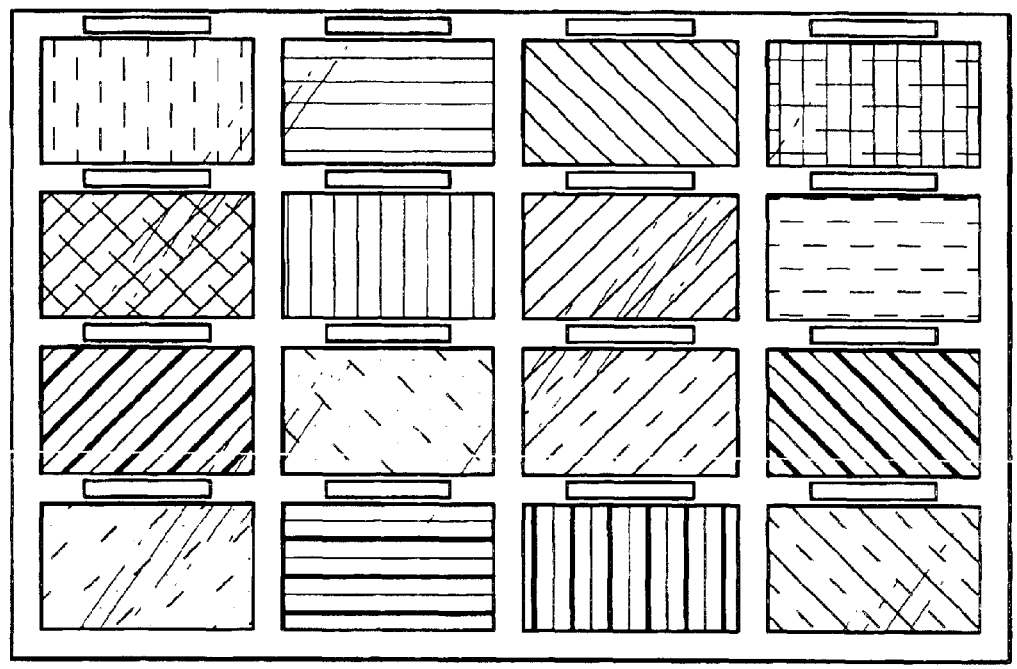
FIG. -37-

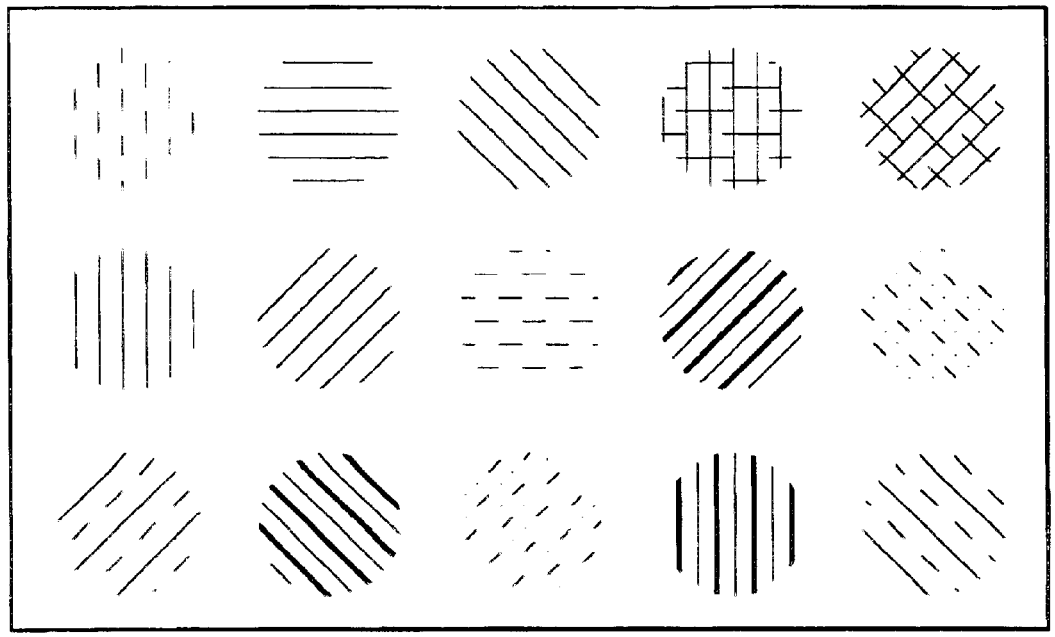
FIG. -38-
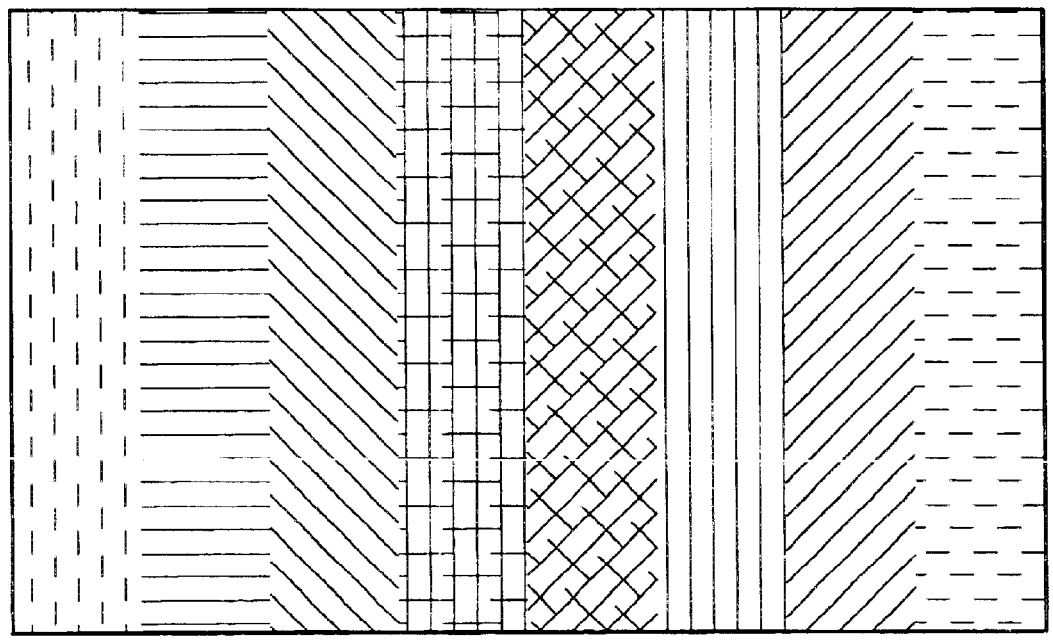
FIG. -39-

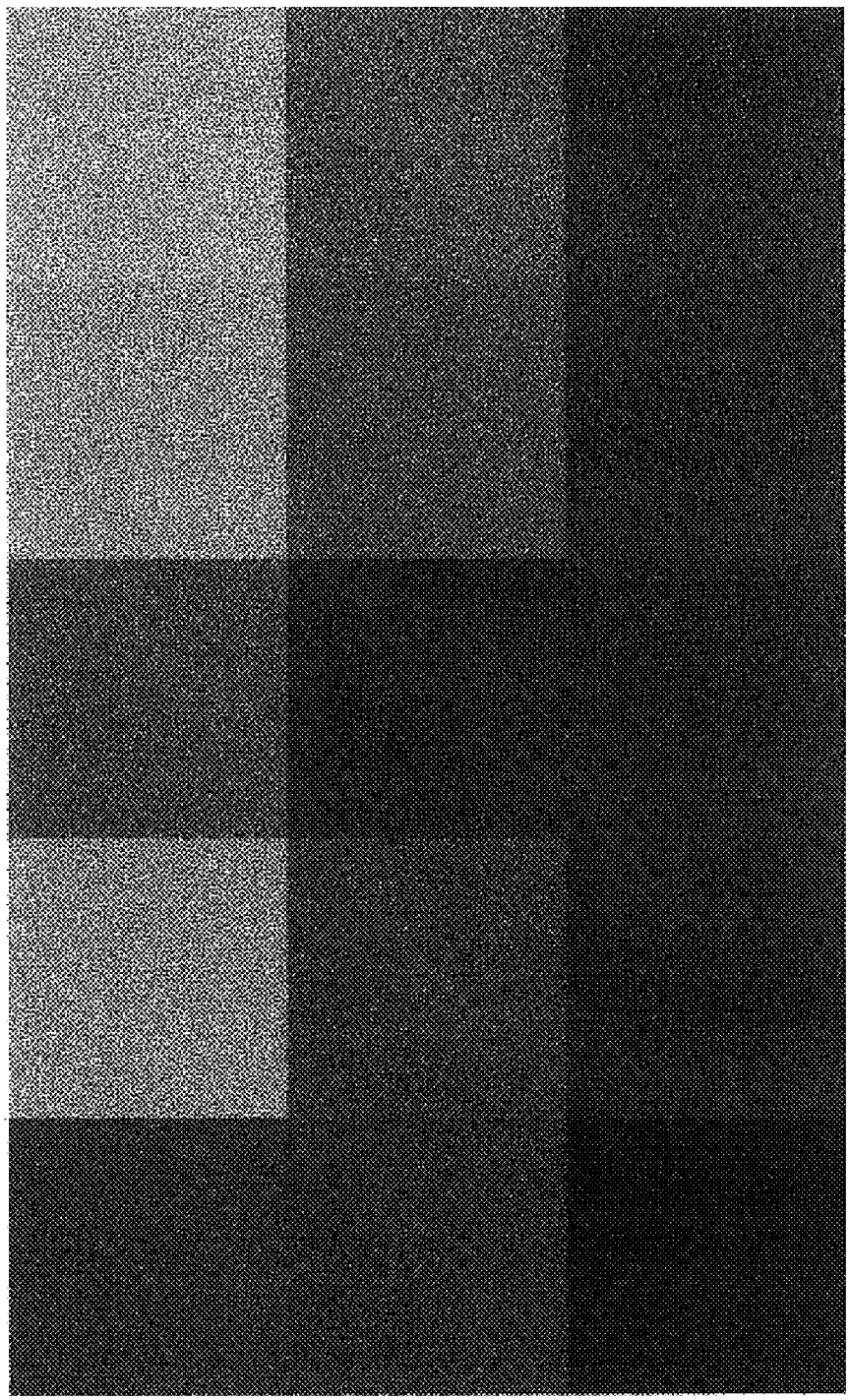
FIG. -40-

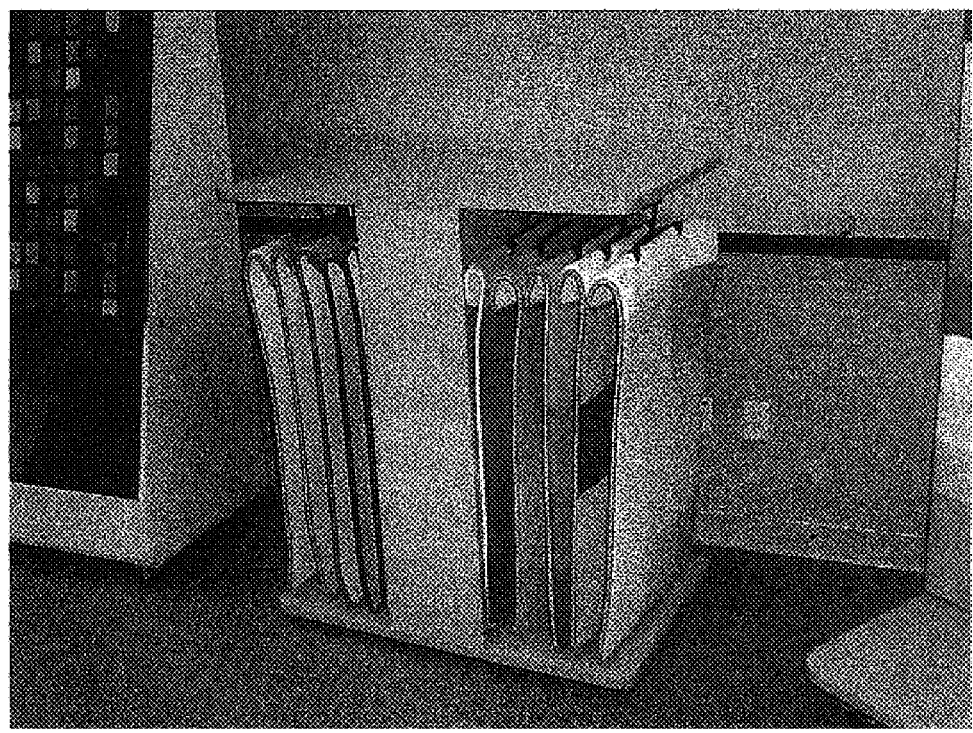
FIG. −41−

FIG. -42-

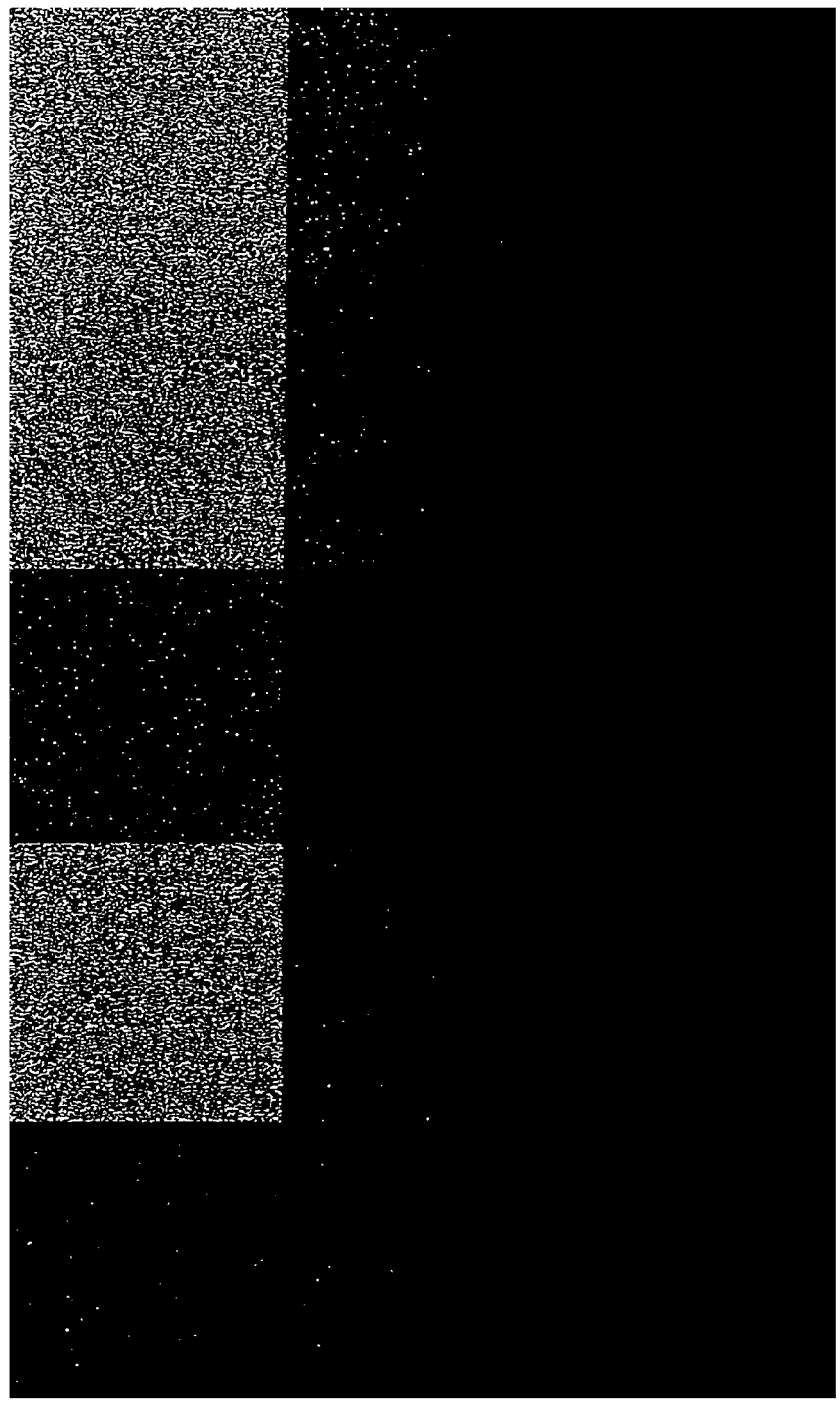
FIG. −43−

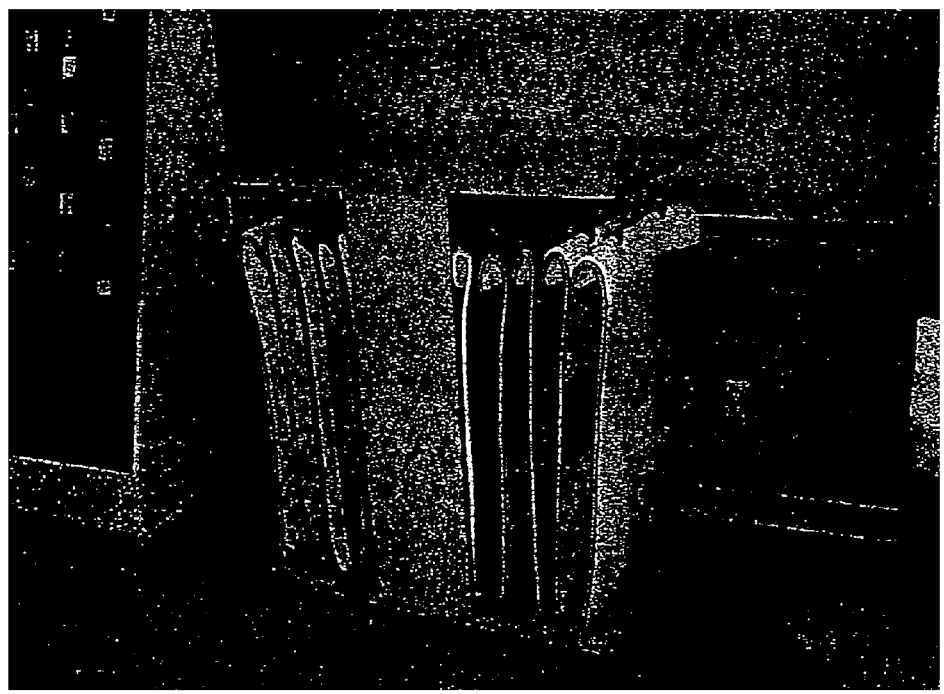
FIG. -44-

FIG. −45−

CARPET CONSTRUCTIONS, SYSTEMS, AND METHODS

CROSS-REFERENCE TO RELATED APPLICATIONS

This application is a continuation-in-part of U.S. patent application Ser. No. 10/138,837, filed on May 3, 2002, hereby incorporated by reference herein.

The present invention relates to novel textile substrates, constructions, samples, rugs, colors, designs, and/or patterns, as well as systems, methods, processes, and/or techniques utilizing such constructions, samples, rugs, colors, designs, and/or patterns for marketing, merchandizing, and/or selling such products, and/or methods of producing such products. More particularly, the textile substrates or constructions are preferably floor covering or surface covering products such as carpet or carpet tiles, especially printed or dyed carpet.

At least certain preferred embodiments of the novel developments described herein also relate to a process for coloring substrates, using the application of liquid colorants, in which the assignment of color is done on a pixel-by-pixel basis. Specifically, the following describes a process, and the resulting product, whereby relatively large areas of a substrate may be given the appearance of being uniformly colored by successively replicating or tiling a group of individually colored pixels comprising a repeating unit (i.e., a superpixel) across the substrate surface. The repeating unit is constructed in such a way that if a colorant application error develops, causing one or more pixels within the repeating unit to be colored incorrectly or incompletely, the overall arrangement of the pixels within the repeating unit will render such error less visually apparent when viewed on the substrate.

Many techniques have been developed for patterning or coloring substrates, notably absorbent substrates, and particularly textile substrates. With the development of the electronic computer, such techniques have included the use of individually addressable dye applicators, under computer control, that are capable of dispensing a pre-determined, and in some cases, variable, quantity of a dye or liquid colorant to a specifically identified area or pixel on a substrate surface. Such techniques have been disclosed in, for example, commonly-assigned U.S. Pat. Nos. 4,116,626, 5,136,520, 5,142,481, and 5,208,592, the teachings of which are hereby incorporated by reference.

In the devices and techniques described in the above-referenced U.S. patents, the pattern is defined in terms of pixels, and individual colorants, or combinations of colorants, are assigned to each pixel in order to impart the desired color to that corresponding pixel or pixel-sized area on the substrate. The application of such colorants to specific pixels is achieved through the use of hundreds of individual dye applicators, mounted along the length of color bars that are positioned across the path of the moving substrate to be patterned. Each applicator in a given color bar is supplied with colorant from the same colorant reservoir, with different arrays being supplied from different reservoirs, typically containing different colorants. By generating applicator actuation instructions that accommodate the position of the applicator along the length of the color bar and the position of the color bar relative to the position of the target pixel on the moving substrate, any available colorant from any color bar may be applied to any pixel within the pattern area on the substrate, as may be required by the specific pattern being reproduced.

It is contemplated that other arrangements or techniques for systematically applying various colorants to a substrate surface in accordance with pattern data, such as, for example, having one or more sets of colorant applicators that are moved or indexed across the face of a relatively stationary or intermittently indexed substrate, may also employ the teachings herein.

Regardless of the nature or configuration of the patterning device, a common problem with the use of such devices involves the occasional malfunction of one or more of the colorant applicators, as when such applicators become clogged, blocked, mis-aligned, or otherwise become incapable of reliably and accurately dispensing to each assigned pixel the required quantity of the assigned colorant to that pixel. If the malfunction is intermittent, such as an applicator that occasionally dispenses the incorrect quantity of colorant, the resulting patterning irregularity may be relatively unobtrusive, depending, of course, upon the nature of the pattern being reproduced, the nature of the substrate being patterned, and other factors. If the malfunction is persistent, such as an applicator that has become blocked, mis-aligned, or has ceased to function altogether, the resulting patterning irregularity may be so obtrusive as to cause visually objectionable streaks, bands, or the like that tend to extend in the direction of primary relative motion between the colorant applicator(s) and the substrate, hereinafter referred to as the "machine direction" (e.g., as indicated by the arrow in FIGS. 1 and 2).

The result of such malfunctions manifests as linear patterning anomalies known as "streaks" or "bands" and may be somewhat visually analogous to the striations associated with old or worn film or videotape images. Areas of the substrate in which the pattern requires a relatively uniform solid color or shade to be reproduced on the substrate are generally the least tolerant of either type of malfunction—such malfunctions result in solid color areas that are non-uniform, either due to the formation of the streaks and bands referred to above, or due to otherwise unintended and visually objectionable pattern irregularities. Accordingly, the uniform appearance of such areas patterned by such patterning devices as described above has been particularly dependent upon the absence of colorant applicator malfunctions.

By use of the teachings herein, substrate pattern areas may be generated that effectively emulate uniformly colored pattern areas, but that have dramatically increased tolerance for individual colorant applicator malfunctions that might otherwise render such pattern areas distinctly non-uniform and visually objectionable. In accordance with one embodiment of the teachings herein, areas of the substrate that are intended to carry a solid color or shade instead may be patterned with an arrangement of different colored pixels, selected to replicate the required color on the substrate, that collectively comprise a repeating unit or superpixel.

The distribution of such colored pixels within such superpixel are carefully constructed to avoid or minimize the formation of visually obtrusive clumps or islands of color within the superpixel, as well as the unintended alignment of such pixels either within a given superpixel or across several superpixels, particularly in the machine direction. In single color areas, the former condition tends to promote a speckled or heathered appearance, which may or may not be desirable, while the latter condition tends to generate visually apparent twill lines under some conditions. When such repeating unit or superpixel is tiled or otherwise replicated across the substrate surface and observed at a distance, this patterned area—although generally comprised of a dense arrangement of chromatically compatible, but not identically colored, pixels—is capable of serving as an effective visual surrogate for a uniformly colored solid shade area on the substrate.

Advantageously, the resulting pattern area, which may, in some cases, result in a somewhat "heathered" appearance, effectively disguises patterning irregularities due to the misapplication of colorant by individual, improperly functioning colorant applicators in individual pixel areas, particularly in cases in which colorant applicator malfunctions are persistent and result in a systematic patterning irregularity that is replicated throughout the pattern area. It has also been found that, through use of such "fault-tolerant" superpixels, the resulting pattern area tends to allow contours in the surface of the substrate, as, for example, would be found in a multi-level carpet substrate, to maintain a desired degree of visual prominence, which the generation of bands, streaks, and the like tends to obscure.

In another embodiment of the teachings herein, the pixels comprising the superpixel may be identically colored, but may be colored in a manner that involves the use of multiple (and technically redundant) colorant applicators to provide an applicator-to-pixel relationship that can disguise individual improperly functioning colorant applicators, as will be discussed in further detail below.

For purposes herein, the following terms shall have the indicated meanings, unless the context or explicit language otherwise dictates.

The term "pixel" shall refer to the smallest area or location in a pattern or on a substrate that can be individually assignable or addressable with a given color.

The term "pattern" and its derivative terms shall mean assigning or imparting one or more colors to a substrate surface, and shall refer both to the assignment of colors to specific pixels and to the corresponding dispensing of liquid colorants on the substrate surface. When used in the sense of a pattern on a substrate surface, the term shall refer to the arrangement of textile fibers that have been dyed by the application, on a pixel-by-pixel basis, of a liquid colorant to the surface of the substrate. While a pattern typically involves different colors, arranged in pre-determined configurations or designs, placed or to be placed in various areas of the substrate surface, it may also refer to the assignment or generation of a single color in all areas of the substrate surface, i.e., a "solid color" pattern. In either case, the color(s) may be generated on the substrate surface through the pixel-by-pixel application of a single liquid colorant (e.g., if the desired color can be reproduced using a single process color), or the application of several different liquid colorants to form an in situ blend on the substrate surface.

The term "heather" and its derivative terms shall mean small scale chromatic non-uniformities within a patterned area on a substrate, somewhat analogous to grain in a photograph or the halftone structure in a printed halftone image. Substrates with significant heather appear speckled or stippled when viewed at close range, although may appear to exhibit a solid color when viewed at a greater viewing distance. In some cases, the generation of heather is desirable, as it provides for the presentation of a variety of different colors, or different shades of the same color, in a way that is visually apparent, but subtle and unobtrusive.

The term "adjacent" and its derivative terms shall be used to mean contiguous, including along a diagonal, i.e., having a shared, common boundary element, including a common side or a common corner.

The term "side-wise adjacent" shall refer to a particular kind of adjacent or contiguous orientation in which the common boundary element consists of at least one common side (i.e., the sharing only of a common corner falls within the definition of adjacent, but does not fall within the definition of side-wise adjacent).

The term "dithering" shall refer to a computer-generated reconstruction of an image, using only pixels having colors found in a pre-defined "dither palette". Dithering software generates, in pixel-wise fashion, an image in which each pixel is assigned a color from the dither palette that, when the image is viewed from a distance, best approximates the target color at that location within the pattern.

The term "Multi-pixel Offset Unit" or "M.O.U." shall be used to describe the smallest group of pixels that collectively represent the desired color. In one embodiment of the teachings herein, an M.O.U. can be thought of as the major component or building block of a superpixel that imparts the correct color (but not necessarily the correct internal placement of pixels) to that superpixel. In that embodiment, several M.O.U.s are arranged so that pixels having the same color are assigned to different columns (i.e., a series of contiguous pixels extending in the machine direction) on the substrate. A specific arrangement of adjacent M.O.U.s can form a superpixel that, when tiled across an area of the substrate, will form the desired color while minimizing the alignment, in the machine direction, of pixels having the same color, thereby making relatively inconspicuous any patterning irregularities (e.g., the formation of streaks and bands) due to the malfunction of any specific colorant applicator.

The term "superpixel" refers to a pre-defined arrangement of pixels, each carrying a pre-determined color (generated by a single process colorant, or by an in situ blend of two or more process colorants applied to the same or adjacent pixels), to be tiled or otherwise replicated across an area on a substrate surface in order to impart a specified color or pattern effect to that substrate surface area. In one embodiment of the teachings herein, a superpixel may be formed by an arrangement of several M.O.U.s or, in another embodiment of the teachings herein, may simply be an arrangement of individual pixels. When used in the context of patterning, the terms "superpixel" and "repeating unit" may be used interchangeably. Superpixels can contain several or dozens of individual pixels.

The term "machine direction" shall refer to the relative direction of movement of the colorant applicators as they are dispensing colorant onto the substrate. It is presumed that the substrate to be patterned is either in the form of a continuous web, e.g., a broadloom floor covering, or is in the form of a series of discrete substrate units, e.g., individual carpet tiles or area rugs, moving along a path leading through the patterning device of choice. Where the applicators are maintained in a fixed position (e.g., on non-moving color bars), the machine direction corresponds to the direction of motion of the substrate through the patterning device. Where the applicators are mounted on a moving platform, e.g., one that traverses across the path of the substrate, the machine direction may be transverse to the direction of motion of the substrate.

The terms "column" and "row" shall refer, respectively, to axes within pixel arrays extending in the machine direction (column) and transverse to the machine direction (row), respectively. With respect to the patterning device of FIGS. 1 and 2, a column of pixels within an M.O.U. or superpixel extends along the length of the conveyor (and extends vertically in the Figures representing individual pixels).

The term "tile" and its derivative terms shall have the conventional mathematical definition, i.e., to position similarly-shaped elements (such as superpixels or other pattern repeat units) having complementary boundaries in adjacent relationship with one another on a surface, so as to cause said complementary boundaries to become common boundaries between adjacent elements, and thereby form a continuous, uninterrupted expanse of said elements over the surface on which said elements are positioned, similar to a jig saw puzzle with identically-shaped pieces.

The term "process colorant" and its derivative terms shall refer to the colorant applied to the substrate by the colorant applicator system. The term "process color" and its derivative terms shall refer to the intrinsic color of the process colorant, prior to any mixing with other colorants on the substrate surface. Process colors, therefore, are colors obtainable without the need for mixing or blending different colorants on the substrate.

The term "twill line" shall refer to the relative position of similarly-colored pixels or pattern elements within a pattern repeat unit that, when the repeat unit is tiled across the substrate, produces an unintended alignment of such pixels or pattern elements that appears as a visually apparent line or band extending, commonly (but not necessarily) in a diagonal direction, over multiple superpixels or pattern repeats.

The term "in situ blend" and its derivative terms shall refer to the separate application of two or more colorants to the same or adjacent pixels on a substrate, with at least some mixing or blending of the colorants taking place following such application.

The term "target color" shall refer to the color specified in the pattern that is to be reproduced or emulated on the substrate using process colorants, perhaps through the use of in situ blending techniques, dithering techniques, or a combination of those techniques.

The term "fill color" shall refer either to a solid color or shade (i.e., a color or shade that is visually uniform and homogeneous) that is formed by a collection of pixels in which all individual pixels have been assigned the same color, or to a color that is formed by a collection of pixels in which at least two pixels within the collection have been assigned different colors in a manner that minimizes any visually discernable pattern to the positioning of differently colored pixels. In this latter case, the resulting color may exhibit a heather or stipple effect when viewed at close range, but may give the appearance of a solid color when viewed at a distance.

The term "fill area" shall refer to areas within a pattern to which are assigned fill colors.

The term "periodic" and its derivative terms shall refer to the systematic, predictable appearance of an irregularity, a specifically colored pixel, or other identifiable pattern component on the substrate. The term "non-periodic" and its derivative terms shall refer to the random or quasi-random appearance of such pattern components on the substrate.

The term "pattern artifact" and its derivative terms shall refer to the introduction of an unintended design element in situations wherein a repeating unit is replicated within an area of the substrate. A pattern artifact arises when certain components within that repeating unit become geometrically aligned with similar components in adjacent repeating units in a way that introduces an unintended design element, such as a twill line, which typically spans many repeating units and is relatively unobtrusive or non-existent when viewed only within the single repeating unit.

The term "pattern irregularity" and its derivative terms shall refer to deviations between the pre-determined pattern and the pattern as reproduced on the substrate. A pattern irregularity, if periodic, can form a pattern artifact.

The term "textile floor covering" shall refer to any absorbent textile substrate (e.g., one that may be described as a non-woven, woven, tufted, bonded, knitted, flocked, or needlepunched textile substrate) that is adapted (perhaps with the addition of an appropriate textile or non-textile backing material) or suitable for placement on a floor or other walking surface. Specifically included as non-limiting examples are carpets, carpet tiles, broadloom, rugs, area rugs, runners, and mats, any of which may be variously comprised of natural and/or synthetic fibers, such as polyamide fibers, wool fibers, or combinations thereof. Non-limiting examples of carpet tiles are described in more detail in commonly-assigned U.S. Pat. Nos. 4,522,857 and 6,203,881, each hereby incorporated by reference herein.

BRIEF DESCRIPTION OF THE DRAWINGS

"The patent or application file contains at least one drawing executed in color. Copies of this patent or patent application with color drawings(s) will be provided by the Patent Office upon request and payment of necessary fee."

FIG. 1 schematically depicts an exemplary patterning device in which a plurality of individually controllable colorant applicators, arranged along the length of a series of color bars, are deployed across the path of a substrate web to be patterned.

FIG. 2 schematically depicts a plan view of the device of FIG. 1, showing patterned areas of the substrate, intended to be uniformly colored, that carry several patterning artifacts caused by individual colorant applicator malfunctions.

FIGS. 3A through 3D depict patterned areas of a substrate at an individual pixel scale. FIG. 3A depicts a fill area of an original pattern, showing the confinement of light and dark pixels to various columns within the pattern. FIG. 3B depicts the results of applying the teachings herein to construct an Multi-pixel Offset Unit ("M.O.U.") to be used in forming an appropriate superpixel in which each column of the pattern contains all four of the individual pixel colors, in accordance with one embodiment of the teachings herein. FIG. 3C depicts the resulting superpixel, suitable for tiling within a fill area of the pattern. FIG. 3D depicts the superpixel as tiled within a fill area.

FIG. 4 depicts a four-by-four pixel array (i.e., a superpixel) that indicates the placement of different colorants within the array in accordance with the teachings herein.

FIG. 5 depicts a six-by-six pixel array (i.e., a superpixel) that indicates the placement of different colorants within the array in accordance with the teachings herein.

FIG. 6A depicts an eight-by-eight pixel array (i.e., a superpixel) that indicates the placement of different colorants within the array in accordance with the teachings herein.

FIG. 6B depicts an alternative eight-by-eight pixel array (i.e., a superpixel) that indicates the placement of different colorants within the array in accordance with the teachings herein.

FIG. 7 depicts a ten-by-ten pixel array (i.e., a superpixel) that indicates the placement of different colorants within the array in accordance with the teachings herein.

FIG. 8 depicts a twelve-by-twelve pixel array (i.e., a superpixel) that indicates the placement of different colorants within the array in accordance with the teachings herein.

FIG. 9 depicts a textile substrate such as a carpet, having a substantially flat surface which has been patterned in accordance with the teachings herein.

FIG. 10 depicts a textile substrate, such as a carpet or carpet tile, having a contoured, textured or uneven surface which has been patterned in accordance with the teachings herein.

FIGS. 11A–19 schematically depict respective top plan views of textile floor covering or textile substrates or constructions such as broadloom carpet, rugs, carpet tiles, runners, mats, or the like such as display rugs having respective selected areas of different colors, shades, patterns, and/or the like in accordance with exemplary embodiments of the present invention.

FIGS. 11A and 11B each depict a textile substrate having selected areas or blocks of different colors or shades of color (solids or heathers).

FIGS. 12A and 12B each depict a textile substrate having selected areas or blocks of different patterns, designs and/or colors.

In each of FIGS. 11A and 12A, the areas of different colors, shades, patterns, designs, textures, and/or the like are separated by a border or frame such as a black or white border.

FIG. 13 depicts a textile substrate having selected areas or blocks of different shades of red (solids or heathers).

FIG. 14 depicts a textile substrate with selected areas or blocks of the same pattern with different background colors or shades (solids or heathers).

FIG. 15 depicts a textile substrate with selected areas or blocks of different colors or shades and patterns.

FIG. 16 depicts a textile substrate with selected areas or blocks with different background and pattern colors or shades.

FIG. 17 depicts a textile substrate with selected areas or blocks, or sections of different color or shade and bases.

FIG. 18 depicts a textile substrate with selected areas or blocks of different shades of color with corresponding color codes.

FIG. 19 depicts a textile substrate with selected areas or blocks of different colors and/or patterns with corresponding pattern and/or color codes.

FIG. 20 depicts a photographic representation of a textile substrate such as a display carpet or rug having rectangular areas or blocks of selected colors (heathers) in a rectangular array. The display rug is located atop a hallway of patterned carpet tile.

FIGS. 21–27 depict photographic representations of respective arrangements of products adjacent heather pattern or color textile substrate such as carpet showing the coordinating effect in accordance with exemplary embodiments of the present invention.

FIG. 21 is a photographic representation of four ceramic tiles placed over a heather patterned textile substrate.

FIG. 22 is a photographic representation of six tiles or tile pieces placed over the heather patterned textile substrate of FIG. 21.

FIG. 23 is a photographic representation of four different tiles or tile pieces over the heather patterned textile substrate of FIGS. 21 and 22.

FIG. 24 is a photographic representation of a piece of patterned carpet with one edge adjacent to eight different heather patterned textile substrates.

FIG. 25 is a photographic representation of three different tiles or tile pieces placed over a tray filled with swatches, samples or pieces of different heather patterned textile substrates.

FIG. 26 is a photographic representation of a tile placed over a tray filled with swatches, samples, or pieces of different heather patterned textile substrates.

FIG. 27 is a photographic representation of two tiles placed adjacent a tray filled with a plurality of different heather patterned textile substrate pieces or samples.

FIGS. 28–35 are black and white copies of the color FIGS. 20–27.

FIG. 36 is a front view of an exemplary display cover having respective transparent windows for each of the color, pattern, or shade areas of a textile substrate or construction (such as shown, for example, in any one of FIGS. 11A–16) and frame or border elements to divide the color, pattern or shade areas, and having space for color, pattern, shade, design, base, and/or the like identifying text or numbers, bar codes, SKU number, and/or the like for each of the color, pattern or shade areas.

FIG. 37 is a front view of an exemplary display unit including the display cover of FIG. 36 over the display rug of either FIG. 11A or 11B.

FIGS. 38 and 39, like FIGS. 11A–19, schematically depict respective top plan views of textile substrates or constructions such as textile floor covering, surface covering, wall covering, or the like.

FIG. 38 depicts a textile substrate having circular areas of different colors or shades which are separated from one another by, for example, a background of white or light beige.

FIG. 39 depicts a textile substrate having elongated rectangular strips or stripes of areas of different colors or shades.

FIG. 40 is a top view color representation of a color family display rug in accordance with one particular embodiment of the present invention having 15 different, contiguous, square areas of different colors or shades.

FIG. 41 is a photographic representation of an exemplary display system holding 10 display rugs like that of FIG. 40.

FIG. 42, is a photographic representation of a person kneeling over a plurality of display rugs such as those shown in FIG. 41 and coordinating the colors of the display rugs with a particular piece of pattern carpet. The piece of pattern carpet includes a number of different colors or shades in a floral design. The person can visually match or coordinate a particular color or shade area of a display rug with one or more of the colors or shades in the floral pattern.

FIGS. 43–45 are respective black and white copies of FIGS. 40–42.

DESCRIPTION OF PREFERRED EMBODIMENTS

The superpixel constructions of at least certain preferred embodiments described herein can be used in conjunction with a variety of patterning devices and substrates, so long as the patterning device is capable of applying colorants to the substrate on a pixel-by-pixel basis in accordance with pre-defined patterning data. FIG. 1 shows an exemplary jet dyeing apparatus 10, such as a Millitron® textile patterning machine developed by Milliken & Company of Spartanburg, S.C., comprised of a set of eight individual color bars 15, with each color bar capable of dispensing dye of a given color, positioned in fixed relationship within frame 20. A greater or fewer number of color bars may be used, depending upon the desired complexity of the apparatus, the need for a wide range of colors, and other factors.

Each color bar 15 is comprised of a plurality of individually controllable dye applicators arranged in spaced alignment along the length of the color bar and supplied with the colorant assigned to that color bar. The number of applicators per unit length of the color bar may be, for example, ten to the inch, twenty to the inch, or some other number. Each color bar extends across the full width of substrate 25. As depicted, unpatterned substrate 25, such as a textile fabric, may be supplied from roll 30 and is transported through frame 20 and under each color bar 15 by conveyor 40, which is driven by a motor indicated generally at 44. After being transported under color bars 15 in a manner that provides for the accurate pixel-wise placement of colorant in precisely-defined areas of the substrate, now-patterned substrate 25A may be passed through other dyeing-related coloring steps such as drying, fixing, etc. With appropriate modification of the transport mechanism, the substrate to be patterned may also be in the form of discrete units (e.g., individual carpet tiles, mats, or the like).

FIG. 2 is a schematic plan view of the patterning device of FIG. 1. Included in this view are block representations of computer system 50 associated with electronic control system 55, electronic registration system 60, and rotary pulse generator or similar transducer 65. The collective operation of these systems results in the generation of individual "on/off" actuation commands that result in the accurate pixel-wise application, on the surface of moving substrate 25, of the colorants necessary to reproduce the desired pattern using the pattern-specified colors, as described in more detail in commonly-assigned U.S. Pat. Nos. 4,033,154, 4,545,086, 4,984,169, and 5,208,592, each of which is hereby incorporated by reference herein.

In the operation of patterning devices such as that depicted in FIGS. 1 and 2, occasionally one or more of the hundreds or thousands of individual dye applicators, each of which may comprise precisely designed, individually-actuatable electro-mechanical valve mechanisms and fluid passageways, may fail to deliver the appropriate volume of liquid colorant to the specified area on substrate 25. Typically, this situation may be due to a mis-alignment, mis-adjustment or a blockage or other malfunction of the applicator(s). If the problem is transient in nature, the resulting pattern irregularity may be quite localized on the substrate and may not be visually obtrusive (depending upon the nature of the pattern, the selected colors, and other factors). If, however, the problem is persistent or frequently recurring, the resulting pattern irregularity may manifest as a noticeable line, streak, or band that extends for some distance in the machine direction, as shown at 84, 86, and 88 in FIG. 2. In either case, the resulting patterned substrate must be considered irregular, and the carpet or other article being patterned may be deemed off-specification and unmarketable as first quality if the irregularity is sufficiently severe. It is also possible that individual applicator characteristics, although within the envelope associated with "normal" applicator performance, may be sufficiently diverse as to generate visually noticeable non-uniformities in "solid" or nominally homogeneous areas of the substrate pattern.

Irregularities of this type, while always undesirable, are particularly visually obtrusive in pattern areas which are intended to carry a uniform solid color, as depicted by areas 70 and 80 in FIG. 2, because it is in these areas that the resulting bands, streaks, and (in the case of momentary or intermittent malfunctions) non-periodic speckles or other pattern irregularities typically are the most visually prominent.

It has been unexpectedly discovered that an effective way to minimize the prominence of such patterning artifacts is to develop a carefully constructed superpixel, comprised of individual pixels of the same or different colors, for use as a repeating unit. By so doing, the visual impact of one or more improperly functioning applicators can be so effectively disguised so as to make the resulting pattern irregularity nearly invisible. There are several techniques that may be used to construct such superpixel, each of which shall be described below.

One preferred approach is depicted in FIGS. 3A through 3D. FIG. 3A depicts a close-up view of a fill area in a pattern, showing the regular arrangement of pixels, each carrying one of the four different colors that collectively, in the pixel color ratios indicated, are necessary to form the target color for that fill area. As is shown in FIG. 3A, the pixels assigned lighter colors and the pixels assigned darker colors are arranged in separate columns (for example, columns 110 and 115, respectively). If the colorant applicator(s) responsible for the application of the respective colorants to columns 110 and 115 functions improperly, and the pixels in one such column are not colored as intended, the resulting pattern irregularity may quickly evolve into a visible pattern artifact due to the straight line nature of the irregularity, as well as the well-known propensity of the human eye to discern such straight line "patterns" when viewed against the more-or-less uniformly colored background of the fill area.

FIG. 3B depicts an approach for adjusting the distribution of the pixels comprising the fill area color in a way that minimizes the visual impact of an improper functioning colorant applicator under these circumstances. This approach begins with the construction of a Multi-pixel Offset Unit or M.O.U., as identified at 120 in FIG. 3B. This is simply a pixel array of the minimum size necessary to contain pixels having the proper colors—in relative numbers reflecting the proper color ratios—necessary to reproduce the target color in the fill area on the substrate. This may involve having some pixels with the same color (as indicated in FIG. 3B) or may involve a set of pixels in which each pixel has been assigned a color that is unique within the M.O.U.

Where multiple pixels having the same color are used, it is preferred that those pixels not be placed in side-wise adjacent relation (i.e., same-color pixels should be separated, or, at a minimum, share only a common corner, rather than a common side). For example, if the desired color is a green, and the process colorants available include only blue and yellow, then the design of the M.O.U. should avoid, to the extent possible, the occurrence of blue or yellow pixels in side-by-side relationship. The visual effect of having groups of pixels assigned the same color is somewhat mitigated by the quantity of colorant used, the degree to which the colorant may be absorbed or diffused by the substrate surface, and other factors.

In the example depicted in FIG. 3A, it will be noted that the original design shows rather prominent vertical banding due to the alignment of pixels of similar colors in the vertical direction (i.e., colors are restricted to specific columns). In order to reach the goal of having all colors appear in each row, the M.O.U. depicted in FIG. 3B is constructed, comprised of a single row eight columns in width. With consideration given to the specific arrangement of pixels within the M.O.U., the M.O.U. is then shifted one row down and three columns to the right, forming a "Z"-shaped superpixel 125 (the shape of which shall be referred to an offset rectangular superpixel) indicated in FIG. 3C. This specific offset yields a superpixel that, when tiled, creates columns of pixels within the tiled areas in which, for every column, all pixel colors are represented. Additionally, it will be observed that pixels of the same color are always separated (in a side-wise adjacent sense) by at least one pixel of a different color, although some pixels of the same color are adjacent in a corner-to-corner sense.

In this way, when the superpixel 125 is tiled across a fill area of the substrate as indicated in FIG. 3D, that fill area will be perceived as having the desired color (i.e., the target color), and the various constituent colors contributed by individual pixels will be arranged in a way (i.e., in columns extending in the machine direction) that can effectively mask the improper functioning of one or more colorant applicators by preventing the formation of continuous streaks or bands (caused by a series of contiguous, improperly colored pixels extending in the machine direction) on the substrate.

The array comprising the Multi-pixel Offset Unit can be square, but preferably, as depicted in FIG. 3B, is more laterally oriented, i.e., one having more columns than rows, where the columns are aligned with the machine direction. This M.O.U. is then replicated and shifted, in both the column direction (i.e., in the machine direction, or vertically in the drawings) and row direction (i.e., laterally with respect to the machine direction, or horizontally in the drawings), for the purpose of assuring that pixels of every assigned color will eventually appear in each and every column. The number of columns and rows in the M.O.U. depends upon the number of different pixel color assignments necessary to create the desired target color, as well as other factors. Although the M.O.U. shown in FIG. 3B happens to be a 1×8 array, M.O.U.s (and corresponding superpixels constructed from such M.O.U.s) are by no means restricted to single rows or to a minimum or maximum of eight columns. Indeed, it is contemplated that M.O.U.s and corresponding superpixels having a greater or lesser number of pixels, in rectangular, offset rectangular, square, or other geometric configuration that accommodates the tiling of the superpixel.

M.O.U.s and corresponding superpixels of this kind may be generated manually, or perhaps with the assistance of a dithering algorithm, using software such as Adobe Photo-Shop® published by Adobe Systems Incorporated, San Jose, Calif., or other suitable design software. In such software, the original pattern is analyzed, on a pixel-by-pixel basis, and an M.O.U.—preferably, but not necessarily, in the form of a rectangular array—comprising all colors necessary to create the target color is identified. As indicated in FIG. 3C, a geometric translation or offset is then performed to arrive at a superpixel that, when tiled, has, in each column (perhaps as extended over multiple adjacent superpixels), pixels representing each of the different colors from the original M.O.U.

While this approach is relatively simple to implement, and will effectively reduce the visual impact of banding and streaking due to colorant applicator malfunctions, it may be less effective at reducing the occurrence of certain pattern artifacts that result from the geometric alignment of individual elements within the pattern, as those elements are tiled throughout an area of the substrate. For illustrative purposes only, it may be seen that the variously colored pixels depicted in FIG. 3A can generate a pattern artifact in the form of distinct "lines" 130 in a diagonal direction (sometimes referred to as twill lines) within the pattern area. In many cases, these twill lines are desirable, or, if not, the combination of substrate absorbency, colorant quantity, and other factors is sufficient to diffuse and mask such areas, thereby preventing the formation of visually obtrusive twill lines. However, in some cases, such twill lines can become visually objectionable where, for example, the pattern is viewed at a relatively low sight angle, as may occur if the pattern extends across a relatively large expanse of substrate (e.g., the carpeting of a large room).

In those situations in which the use of M.O.U.s in accordance with the teachings above results in the formation of twill lines that cause visually objectionable pattern artifacts, an alternative embodiment for the arrangement of pixels within a superpixel may be used. Through use of this alternative embodiment, as described below, the resulting superpixel (1) will be relatively resistant to the formation of patterning irregularities due to the malfunction of one or more colorant applicators, as discussed herein, and (2) will be relatively resistant to the formation of patterning artifacts such as twill lines.

It has been unexpectedly determined that adaptation of some of the techniques used in the art of constructing sateen weaving patterns can be advantageously adapted to the generation of superpixels, to achieve the same goals as the technique described above, i.e., distributing pixels within a superpixel in a manner that reduces the apparent alignment of pixels of the same or similar color, so that applicator malfunctions do not generate bands and streaks that appear so visually prominent as to render the pattern visually objectionable. In particular, the techniques and patterns used to generate irregular sateen weaves have been found to be particularly well suited to the generation of superpixels that do not give rise to visually prominent pattern artifacts, including unintended twill lines. The details of these novel adaptations are given below.

FIG. 4 depicts a 4×4 array 140, representing 16 individual pixels, each representing one of four different colors, arranged within a 4×4 superpixel. The relative numbers of the respectively colored pixels is determined by the desired target color within the fill area of the pattern, and may be adjusted as necessary. The arrangement of the individually-colored pixels within the superpixel, however, is preferably in accordance with the arrangement set forth in FIG. 4. This arrangement, derived from and analogous to irregular sateen patterns found in the weaving art, involves the strategic placement of colors in a way that minimizes or prevents the occurrence of same color more than once in any given row or column, and minimizes the occurrence of patterning artifacts such as twill lines generated by the diagonal alignment of pixels of substantially the same color. At the same time, this arrangement achieves its primary objective, that of a superpixel construction that is resistant to patterning irregularities due to the malfunction of one or more colorant applicators, a consideration totally inapplicable to the weaving art.

There are various ways in which the actual selection of color to be assigned to each of the 16 pixels can be made. For example, one can use a dithering algorithm to develop a spectrum of colors that, when properly arranged, will mimic the desired target color. Because dithering algorithms usually define both the proportion and the arrangement of variously colored pixels on the substrate, using the teachings herein in combination with dithering techniques must be done with care to avoid compromising the chromatic or visual effectiveness of the resulting dithered pattern. Accordingly, in many cases it will be preferred to use the teachings herein in conjunction with more traditional methods of superpixel generation, i.e., using the skills of a designer to construct, on a pixel-by-pixel basis, a superpixel having the desired composition of variously colored pixels, distributed in accordance with the teachings herein, to be used in coloring a given fill area within an overall pattern.

Although a superpixel based upon the 4×4 array discussed above may be quite effective in emulating the desired target color, it imposes a moderate limitation on the designer in terms of the number of pixels available to (1) generate the desired perceived color, through dithering or other means, and (2) distribute the variously colored pixels within the superpixel in a way that minimizes both heather and the appearance of twill lines. It has therefore been found preferable in many cases to use a somewhat larger array, thereby increasing the flexibility of individual pixel placement and the range of perceived color that can be represented by the superpixel. If a primary objective of minimizing the inadvertent generation of visually prominent twill lines is to be met, the construction of larger N×N arrays should limit N to even integers; arrays of odd order (e.g., where N is an odd integer) tend to arrange similarly colored pixels in ways that form diagonal twill lines, analogous to the teachings associated with the theory of "regular" sateen weaving constructions.

FIG. 5 depicts a 6×6 array 150, representing 36 individual pixels within a 6×6 superpixel. As shown in FIG. 5, it has been assumed that a total of six different colors will be needed to reproduce the desired target color. As before, different proportions of the various colors may be used, as necessary. It should be noted that, once the placement of the first color within the superpixel is complete, the placement of the remaining five colors can be derived simply from choosing a procedure (e.g., consistently placing each successive color in the pixel having same relative position with respect to the preceding pixel, as explained below) that will place those remaining colors in the same position relative to the first color. By so doing, the placement of the remaining colors can be presumed to be placed in a way that will minimize or prevent the occurrence of pattern artifacts, and will also serve the overall objective of creating a superpixel that is resistant to colorant applicator malfunctions.

Accordingly, the superpixel depicted in FIG. 5 has been constructed by assignment of the first color in accordance with sateen weaving practice. For purposes of discussion, such pixels may be referred to as "base" pixels, as these pixels form the reference points from which the color assignment of all other pixels within the superpixel are determined. The second color is assigned to the pixel directly above the first color pixel in each of the columns. The third color is assigned to the pixel directly above the second color pixel in each of the columns, and so forth, with appropriate wrapping, i.e., with the assignment reverting to the bottom of each column when the upper portion of the column is filled. Alternatively, the procedure could have called for assignment of the second color to the pixel to the immediate right of the first color, assignment of the third color to the immediate right of the second color pixel, and so forth, with appropriate wrapping in each case.

By extension, corresponding assignments to the left, or below, or some other consistent relative placement using the pixel assigned to the immediately preceding color as the "base" or reference pixel, is also contemplated. The objective of these various placement algorithms is the same: by consistently following the same rule for all colors in the superpixel, the individual pixels of a given color will be distributed throughout the area tiled by the superpixel in the same way as the pixels of all other colors contained in the superpixel (i.e., when accommodations are made for lapping, all pixels of any given color form the same pattern within the area tiled by the superpixel).

This approach can be adapted to superpixels constructed from larger arrays, as well.

FIGS. 6A and 6B depict alternative 8×8 superpixels 160A and 160B, again with placement of the base pixels carrying the first color being in accordance with sateen weaving practice and using the "adjacent and above" process to establish the position of the remaining seven colors. FIGS. 7 and 8 show respectively larger superpixel constructions for use, for example, where a larger number of individually colored pixels must be used as dither elements to generate the desired overall color from the available set of process colors.

Depending upon the choice of colors, it has been found that, while all such procedures might be equally effective at minimizing the generation of twill lines, not all are equally effective at distributing various colors throughout the superpixel in a way that maximizes the relative uniformity or homogeneity of the color throughout the pixel. For example, if a dithering algorithm specified a given proportion of individual blue and green pixels within a superpixel in order to achieve a desired overall color, it would be undesirable to consolidate all the blue and green pixels and place them on opposite sides of the superpixel, rather than intersperse them throughout the superpixel (to the extent consistent with the dithering algorithm and the resulting overall visual effect presented by the dithered area).

The preceding discussion has been primarily directed to the distribution of colors within a superpixel. The discussion that follows is directed primarily to the selection of the colors to be distributed, with the objective of emulating, as closely as possible given the selection of available process colorants and available blending and dithering techniques, the target color in fill areas of the substrate.

If the number of process colors needed to generate a given pattern is relatively small and a specific fill color area within that pattern is particularly large or otherwise prominent (or, for example, if the "pattern" consists of a single uniform solid color that is a process color or a simple in situ blend of a relatively few process colors), it is contemplated that the patterning device can be operated with several of the color bars dispensing the same colorant, but with use of the techniques disclosed herein for distributing such colorant on the substrate surface. If, for example, the substrate is to be dyed a uniform shade of red, and that color corresponds to an available process colorant, then several of the color bars (e.g., bars 1 through 4, or bars 2, 4, 6, and 8) of the patterning device of FIGS. 1 and 2 can be loaded with that same red process colorant. The manner in which this colorant is applied to the substrate, however, is governed by the teachings herein—a superpixel is constructed in which the colorants from color bars 1 through 4 are regarded as separate and distinct for purposes of assigning colorant to individual pixels within the area of the substrate to be colored, and that superpixel (e.g., one constructed along the lines of FIG. 3C or FIG. 4) is tiled across the surface of the substrate. The overriding principle is similar: relying upon different colorant applicators to provide the same colorant to different side-wise adjacent pixels extending in the machine direction.

By so doing, the contribution of the colorant applicators on any individual color bar 1 through 4 is dispersed throughout the superpixel and thereby effectively dispersed throughout the pattern area in a manner that encourages an artifact-free, uniformly colored solid shade area that is free of visually obtrusive bands and streaks due to applicator malfunctions (or perhaps due merely to within-specification mechanical differences among various colorant applicators). It should be noted that, where an artifact-free, uniformly-colored solid shade is desired, it may be unnecessary to use a superpixel containing 16 or more pixels (as depicted in FIGS. 3C and FIGS. 4 through 8), particularly if the target color is expressed by a process colorant or can be easily derived (e.g., via in situ blending) from a relatively few process colorants. In that case, it is contemplated that smaller superpixels, perhaps containing as few as four pixels, may be used, either in a square array, an offset rectangular array, or some other readily tile-able configuration. Specifically contemplated in such circumstances are superpixels in the form of N×M pixel arrays, where N and M can be equal or different, and the total number of pixels can be 4, 6, 8, 9, 10, 12, or 14.

At the other extreme, where the desired pattern requires colors that do not easily correspond to the process colors in use, but rather must be derived from a given set of process colors, several techniques may be used. For example, two or more colorants may be applied to the same pixel area, thereby forming an in situ blend of the two process colors. By adjusting the order and the relative proportion of the delivered colorants, an individual pixel can be made to carry any one of a spectrum of colors not directly represented by any single process color, but rather represented by various combinations of the process colors (i.e., various combinations of process colorants). A second example involves dithering, a well-known graphic arts technique in which a pixel of a given, unavailable color (i.e., not a process color or an achievable blend of process colors) may be approximated by the substitution of a small group of pixels that are colored with process colors or achievable blends of process colors (collectively, such colors are said to make up the "dither palette") in a way that, at a distance, gives the appearance of the desired color.

There are many software algorithms available to accomplish dithering, such as those found in Adobe Photoshop®, Adobe Illustrator®, Corel Draw®, etc. or those based upon the work of Thiadmer Riemersma, as described in "A Balanced Dithering Technique," appearing in the December, 1998 issue of C/C++ User's Journal, or, often preferably, those based upon Floyd-Steinberg dithering and described, for example, in the article appearing at Page 253 of the Mar. 28, 1995 issue of in "PC Magazine." The image to be dithered is analyzed and re-constructed using only pixels having colors found in a predetermined dithering palette, using the conventional dithering techniques found in the commercially available software discussed above, or other appropriate dithering software.

The colors that comprise the dithering palette may be those colors comprising the "primary" or process colors available for dispensing by the patterning system to be used, for example, the colors associated with each of the eight color bars 15 of FIGS. 1 and 2. If the printing system allows for the in situ blending of colors, in which different colors may be generated by the mixing or migration of colorants after the colorants have been applied to the substrate, the dithering palette may be augmented by the addition of various combinations of process colors, as applied to the same or adjacent pixels, thereby forming in situ mixtures or blends of process colors on the substrate surface. This will provide a dithering palette having many more colors that the number of available process colors. In a preferred embodiment, the colors of the dithering palette are comprised of (1) colors of the available liquid colorants to be used in the printing process, (2) pre-selected proportional blends of those colors, as those colors would appear if applied in sequence to the same pixel and allowed to mix on the substrate, one color superimposed on the other, to achieve an in situ blend of the applied colors, and (3) colors in which such proportional blends are intended to migrate and mix across pixel boundaries in a controlled, predictable way, for example, in accordance with the teachings of commonly-assigned U.S. patent application Ser. No. 08/834,795, the teachings of which are hereby incorporated by reference.

The above-referenced U.S. patent application describes a special case in which a potential limitation in the colorant delivery system may be overcome when attempting to generate mixtures of colors on a substrate. It is known that colors that are not available as process colors may be generated by blending specific combinations of process colors on the substrate, i.e., two or more different colorants are applied to the same area on the substrate and are allowed to mix, thereby forming a new color. A potential problem arises when the relative proportion of a constituent colorant is less than the delivery system of the patterning device can accommodate.

For example, assume that a specific shade of green is desired, and must be generated from a combination of process colorants of blue and yellow. Assume further that the specific shade of green desired is achievable only if the relative proportion of those colorants, individually applied to the same pixel-sized area of the substrate, is 2 parts blue and 8 parts yellow. The valve response of the patterning device may be unable to deliver the blue colorant in such a small quantity—assume, for example, that a 30% saturating quantity (based on a baseline saturating quantity of 100%, i.e., that quantity that is sufficient to fully saturate, but not oversaturate, the substrate at that location) is the smallest quantity of colorant that can be reliably delivered to an individual pixel. In that case, it is possible to form the desired shade of green by forming a multiple pixel structure, generally comprised of between two and sixteen or more individual, contiguous pixels that may be used within the image in the same manner as a single pixel. The number of pixels to be used depends upon a number of factors, including the ratio of colorants forming the desired blended color and the desired relative granularity or "heather" that is artistically acceptable in the pattern.

This multiple pixel structure, a specific kind of superpixel referred to as a "metapixel," is characterized by the formation, within the metapixel, of individual pixels that are relatively oversaturated with colorant and adjacent pixels that are relatively undersaturated with colorant, thereby encouraging the migration of colorant from the oversaturated areas to the undersaturated areas. As a consequence, minimum colorant delivery limitations can be overcome by calculating and delivering a quantity of colorant that, on average, meets the proportional blending requirements of the desired color. In this instance, the blue and yellow colorants are applied to the group of contiguous pixels forming the metapixel in a way in which the average quantity of blue colorant contained throughout the metapixel is 20% and the average quantity of yellow colorant contained throughout the metapixel is 80%, yielding an average quantity of colorant that is 100%, i.e., that quantity of colorant that saturates, but does not oversaturate, the substrate at that location. As explained below, this can be achieved using several combinations or arrangements of pixels to which various individual colorant quantities—but never less than 30% of any single colorant—have been applied.

An elementary metapixel can be imagined by thinking of four contiguous pixels, arranged in a square (e.g., 2×2) array, intended to reproduce a shade of green. Assume that two of these pixels, perhaps arranged along a diagonal, each contains 40% of a saturating application of blue colorant, as well as 80% of a saturating application of yellow colorant. While each of these applications of colorant would be undersaturating if considered individually (because each is less than 100%), the combination of colorants in each of these two pixels results in a 120% level of saturation (40%+80%), and therefore results in an oversatuating condition within those two pixels. Assume that into the remaining two pixels comprising the square array is placed an 80% saturating application of yellow colorant. The resulting combination averages to a 20%/80% proportion of blue colorant to yellow colorant within the four pixel array, which presumably is the appropriate ratio needed to reproduce the desired shade of green, and yields an average saturation level of 100%. Given the absorbent nature of the textile substrates to which this technique is applicable (which substrates tend to promote inter-pixel blending of colorants, and, particularly, the migration and blending of colorants from oversaturated areas into undersaturated areas), the overall effect is that of a four pixel array in which the overall color is similar to that which would have been obtained by the application of a 20% quantity of blue colorant and an 80% quantity of yellow colorant to each of the four pixels comprising the array.

Alternatively, this same overall colorant average within the metapixel array could have been achieved by the same 40% application of blue colorant to the same two pixels within the array, but with the remaining two pixels each receiving all of the necessary yellow colorant (i.e., an oversaturating, 160% application). Generally, because this latter distribution of colorants must rely more heavily upon unrestricted colorant migration on the substrate, the first described colorant application process (i.e., creating two individual pixels having a 40%/80% blue/yellow colorant application and two individual pixels having an 80% yellow colorant application, and therefore constructing an array in which the yellow colorant is more uniformly applied within the array) will be preferred under most conditions. Of course, metapixel arrays comprised of other configurations of oversaturated and undersaturated pixels can be constructed—for example, 3×3 arrays, or irregularly shaped arrangements of pixels—so long as (1) the average proportion of colorants within the metapixel array reflects the proportions of colorants desired, (2) overall average saturation level within the metapixel does not appreciably exceed 100% (to avoid drying and other problems), and (3) the minimum colorant delivery limitations of the patterning device are observed.

The techniques described above are believed to be applicable to a variety of substrates, although absorbent textile substrates are preferred. It is contemplated that such preferred substrates may comprise interior fabrics and substrates, such as drapery and upholstery fabrics, table linen, and various floor coverings, as well as other textile applications (e.g., automotive interior fabrics and carpeting, automotive and non-automotive floor mats, etc.). It has been found that this technique is particularly well adapted for use in decorative floor covering applications, including carpets, rugs, carpet tiles, mats, and the like. The following are examples of two such applications.

EXAMPLE 1

The substrate is a high twist frieze cut pile carpet, comprised of two-ply, high twist nylon 6,6 yarn (1180 filament, 17 dpf) woven into a 4 oz. woven polypropylene backing at 7.8 stitches per inch and having a tufting gauge of 1/8 inch that results in a total finished pile height of about 3/4 inch and a yarn weight of about 38 oz./sq. yd. This substrate is then patterned in accordance with the teachings herein, as follows.

The pattern desired is merely a relatively uniform color, with the intentional introduction of heather for visual interest. The original pixel-wise components of the desired color are indicated in FIG. 3A. However, because of the concentration of certain colors within certain columns, it is recognized that this pattern is vulnerable to streaking and banding. Accordingly, the same pixels, in the same proportion, are rearranged to form an M.O.U., as indicated in FIG. 3B. The M.O.U. is then configured to form a superpixel that (1) represents the desired color (due to the selection of the colors of the individual constituent pixels) and (2) forms a replicatable unit that can be tiled across the substrate, as shown in FIGS. 3C and 3D. The proper color applicator actuation instructions are generated, and the carpet is patterned using the device of FIGS. 1 and 2. The result is a carpet having a pattern in which fill areas have an exceptionally uniform appearance and, at a modest viewing distance, give the appearance of a solid color, as depicted in FIG. 9.

EXAMPLE 2

The substrate is a loop pile carpet tile, comprised of three-ply, space dyed and heat set nylon 6,6 yarn tufted in 1/8 inch gauge resulting in a finished pile height of 0.125 inch and a yarn weight of 20 oz/sq. yd. The carpet backing is PVC-Free Comfort Plus Cushion. To give additional visual interest, the pile is sculpted somewhat, yielding a slightly undulating surface. This substrate is then patterned in accordance with the teachings herein, as follows.

The pattern desired is comprised of pre space dyed yarn that is then overdyed completely with areas of contrasting color, similar to the design shown in FIG. 10. The pixel-wise components of the desired color for the fill areas are determined by a designer using design software, and are determined to require six process colors. The arrangement of those colors, on an individual pixel basis, is accomplished in accordance with the teachings herein, as indicated in FIG. 6A. The resulting superpixel (1) represents the desired color (due to the selection of the colors of the individual constituent pixels) and (2) forms a replicatable unit that can be tiled across the substrate, as shown in FIG. 6A. The proper color applicator actuation instructions are generated, and the carpet is patterned using the device of FIGS. 1 and 2. The result is a carpet having a pattern in which fill areas have an exceptionally uniform appearance and, at a modest viewing distance, give the appearance of a solid color, as depicted in FIG. 10.

EXAMPLE 3

The substrate is a loop pile carpet tile, comprised of two-ply, high twist nylon 6,6 yarn (1180 filament, 17 dpf) woven into a 4 oz. woven polypropylene backing at 7.8 stitches per inch and having a tufting gauge of 1/10 inch that results in a total finished pile height of about 3/4 inch and a yarn weight of about 18 oz./sq. yd. To give additional visual interest, the pile is sculpted somewhat, yielding a slightly undulating surface. This substrate is then patterned in accordance with the teachings herein, as follows.

The pattern desired is comprised of a colored background with large fill areas of a contrasting color, similar to the design shown in FIG. 10. The pixel-wise components of the desired color for the fill areas are determined by a designer using design software, and are determined to require six process colors. The arrangement of those colors, on an individual pixel basis, is accomplished in accordance with the teachings herein, as indicated in FIG. 6A. The resulting superpixel (1) represents the desired color (due to the selection of the colors of the individual constituent pixels) and (2) forms a replicatable unit that can be tiled across the substrate, as shown in FIG. 6A. The proper color applicator actuation instructions are generated, and the carpet is patterned using the device of FIGS. 1 and 2. The result is a carpet having a pattern in which fill areas have an exceptionally uniform appearance and, at a modest viewing distance, give the appearance of a solid color, as depicted in FIG. 10.

EXAMPLE 4

Frieze

The specifications for one preferred form of a broadloom carpet product is described in the table below:

Frieze Broadloom Carpet

| | | Preferred Embodiment |
|---|---|---|
| | (A) | (B) |
| 1. | Product Name: | Milliken ® Pattern Mates ™ carpet |
| 2. | Face: | High Twist Frieze Cut pile |
| 3. | Primary Backing: | Woven polypropylene (PolyBac - 4 oz/yd$^2$) |
| 4. | Total Finished Yarn Weight: | 38 oz/yd$^2$ |
| 5. | Stitches Per Inch: | 7.81 |
| 6. | Tufting Gauge: | ⅛ |
| 7. | Yarn Polymer: | Nylon 6,6 |
| 8. | Yarn Type: | 1180 filament, with antistat, semi dull trilobal, 17 dpf |
| 9. | Yarn Twist: | 7.50 twist per inch in singles (S) and ply (Z) |
| 10. | Yarn Ply: | 2 ply twisted |
| 11. | Heatset: | Yes, @ 260 to 264° F. with steam frieze |
| 12. | Yarn Size: | 3.69/2 cotton count |
| 13. | Tufted Pile Height: | 48/64 inches (¾") |
| 14. | Dyeing Method | Jet Dye, Millitron ® jet dye machine |
| 15. | Precoat Adhesive | Styrene Butadiene Latex, 12 oz/yd$^2$ coating weight |
| 16. | Preferred Color | Beige |

EXAMPLE 5

Heavy Weight Frieze

The specifications for one preferred form of a broadloom carpet product is described in the table below:

Frieze Broadloom Carpet

| | | Preferred Embodiment |
|---|---|---|
| | (A) | (B) |
| 1. | Product Name: | Milliken ® Pattern Mates ™ Pluscarpet |
| 2. | Face: | High Twist Frieze Cut pile |
| 3. | Primary Backing: | Woven polypropylene (PolyBac - 4 oz/yd$^2$) |
| 4. | Total Finished Yarn Weight: | 55 oz/yd$^2$ |
| 5. | Stitches Per Inch: | 11.75 |
| 6. | Tufting Gauge: | ⅛ |
| 7. | Yarn Polymer: | Nylon 6,6 |
| 8. | Yarn Type: | 1180 filament, with antistat, semi dull trilobal, 17 dpf |
| 9. | Yarn Twist: | 7.50 twist per inch in singles (S) and ply (Z) |
| 10. | Yarn Ply: | 2 ply twisted |
| 11. | Heatset: | Yes, @ 260 to 264° F. with steam frieze |
| 12. | Yarn Size: | 3.69/2 cotton count |
| 13. | Tufted Pile Height: | 48/64 inches (¾") |
| 14. | Dyeing Method | Jet Dye, Millitron ® jet dye machine |
| 15. | Precoat Adhesive | Styrene Butadiene Latex, 12 oz/yd$^2$ coating weight |
| 16. | Preferred Color | Beige |

FIGS. 11A and 11B each show exemplary textile substrates or constructions such as textile floor covering, such as cut or loop pile tufted broadloom carpet (including tufting yarn, a primary backing, and a tuftlock or precoat such as latex with or without additional backing materials or layers such as a secondary backing, cushion or pad) having on its face an arrangement of 16 different color areas or blocks of solid or heathered colors or shades. In FIG. 11A, each of the colors is separated by, for example, black (or dark) dividing lines or borders. In FIG. 11B, the color areas or blocks are contiguous and not separated by dividing lines.

The color areas or blocks of FIGS. 11A and 11B may be produced by, for example, printing, dyeing or graphics tufting the selected colors. It is preferred that the color areas (and dividers or borders) be produced on a single substrate by printing or dyeing, and most preferred by jet dyeing by, for example, a Millitron® jet dye machine.

The textile substrate may be a large display carpet or rug, a small display sample rug, broadloom carpet, an area rug, floor mat, runner, carpet tile, or the like.

Preferably, the color areas are each distinct different solid colors or heathers or different shades of the same color or hue. The colors may be related as being in the same color family or may be complimentary colors. It is preferred that the colors be jet dyed as describe above in a fashion which eliminates, reduces, or masks streaks, bands, inoperative jets, or the like.

Alternatively, as shown in each of FIGS. 12A and 12B, exemplary textile substrates or constructions such as textile floor covering, such as cut or loop pile broadloom carpet have 16 different pattern areas or blocks on the face thereof. In FIG. 12A, the pattern areas are separated, for example, by black or dark borders or dividing lines. In FIG. 12B, the pattern areas are not separated by such borders or dividers.

Again the patterned substrates of FIGS. 12A and 12B may be formed by, for example, printing, dyeing or graphics tufting, but are preferably formed by printing or dyeing, more preferably by jet dyeing, for example, by a Millitron® jet dye machine.

FIG. 13 schematically represents a textile substrate, such as that of FIG. 11A, having different shades of the color or hue red thereon. For example, 4 different light reds (LR1, LR2, LR3, LR4), 4 different medium reds (MR1, MR2, MR3, MR4), 4 different reds (R1, R2, R3, R4), and 4 different dark reds (DR1, DR2, DR3, DR4). For example, light red 1 (LR1) may be brighter than light red 4 (LR4). Such a color family, color palette, or color shade display carpet, rug, mat or tile as shown in FIG. 13 may or may not include dividers or borders between the color areas (blocks) and may be sized for the desired purpose (large for a floor or wall, small for a sample in a sample rack or to be carried, shipped or mailed).

FIG. 14 shows a similar textile substrate having patterned areas or blocks of a similar pattern and different background colors or shades of colors. Each of the 16 areas or blocks has a similar pattern and a different background color or shade such as different colors or shades of green (GR1, GR2, GR3, GR4), of blue (B1, B2, B3, B4), of yellow (Y1, Y2, Y3, Y4), and of red (R1, R2, R3, R4).

FIG. 15 shows a patterned textile substrate like that of FIGS. 12 and 13 in that the 16 different areas or blocks have different patterns and different shade of a color. As shown, the backgrounds are different colors, hues, or shades of blue (different shades of light blue (LB1, LB2, LB3, LB4), medium blue (MB1, MB2, MB3, MB4), blue (B1, B2, B3, B4), and dark blue (DB1, DB2, DB3, DB4). The different shades may be greyer, whiter, brighter, subdued, greener, yellower, etc.

The patterned textile substrate of FIG. 16 is like that of FIG. 14 in that it has the same pattern in each of the pattern areas or blocks, but the background colors are all the same and the pattern (or pattern element) colors are each different. As shown, the backgrounds or background color are all brown (BR1), while the patterns (or pattern elements) are each a different color or shade (green (G1, G2, G3, G4), brown (BR2, BR3, BR4, BR5), white (W1, W2, W3, W4), blue (BL1, BL2, BL3, BL4)).

The textile substrate of FIG. 17 differs from that of FIGS. 11A–16, 18 and 19 in that the base has sections (multiple areas or blocks) of different base constructions. As shown, there are cut, loop, and cut and loop (cut/loop) pile sections. Each section has 4 different areas or blocks of different colors, hues, or shades of red (R1, R2, R3, R4).

FIG. 18 shows a textile substrate like that of FIG. 13 except that each of the color areas or blocks of FIG. 18 includes a color and/or shade code, designation, or the like which helps identify the selected or desired color and facilitates ordering product in that color. The color and/or shade code may also designate a particular base, pattern, color, etc. In FIG. 18, the respective codes RD503, RD505, RD504, RD506 are for respective different red shades (RD1, RD2, RD3, RD4). The textile substrate may or may not have dividers or borders between the color area or blocks. Preferably, the color and/or shade code is printed or dyed right on the base along with the color, shade, pattern, or the like.

The textile substrate of FIG. 19 is similar to that of FIG. 18, except that the color codes are located in white (or light colored, like light beige) boxes within the color or pattern areas or blocks. In FIG. 19, the codes X421, K777, Y972, B623 correspond to respective colors red (R1), blue (B1), green (G1), and yellow (Y1). Such color or shade codes may be added to each of the color or shade or pattern areas or blocks of the textile substrates of FIGS. 11A–17.

Although the textile substrates of FIGS. 11A–16 have 16 color, shade or pattern areas, of FIG. 17 has 12, and of FIGS. 18 and 19 have 4, it is to be understood that the textile substrates of the present invention may have one or more such areas, preferably two or more, most preferably four or more. The more color areas per carpet, rug, mat, or tile, the more choices that are presented to a potential customer. Also, the display or sample rugs may be of any desired size, shape (square, rectangular, oval, round, triangular, or the like), of any base construction and the color or pattern areas thereon may be contiguous or non-contiguous and may be of any size and shape.

In accordance with at least one embodiment of the present invention, a residential broadloom (wall-to-wall) carpet product having heathered or solid colors or color areas dyed or printed thereon using the above-described super pixel constructions or patterning structures is provided.

In accordance with at least one other embodiment of the present invention, a residential broadloom (wall-to-wall) carpet product having one or more heathered colors or color areas dyed or printed thereon using the above-described super pixel constructions or pattern structures is provided. Preferably, the heathered colors or color areas are produced using two or more colors or shades, more preferably three or more colors or shades.

In accordance with at least one embodiment of the present invention there is provided a coordinating multi-colored twist yarn carpet having special applicability as a display carpet and selling tool and which includes the colors in a colorline of a product being displayed on one piece of carpet or a display rug. The number of colors included can be more than two with no limit to the maximum number. All of the included colors are designed on or in a quilt type or patchwork type fashion. The individual color areas can be printed or dyed on one substrate or manually seamed together. The display carpet or rug is for the purpose of showing the colors available in a product line to aid in the merchandising of that product. The display carpet or rug may be displayed on the floor, on the wall, or the like.

For example, FIG. 20 shows an example of such a display carpet or rug having over 100 different colors (solids or heathers) in the form of rectangular color areas set out in a rectangular array on a carpet or rug having dimensions of about 4'×21' with each color area having dimensions of about 9.6"×1'. Each of the colors is preferably a heather pattern or structure of three or more colors (process colors, blended colors, or target colors). One example of such a display carpet or rug is a Pattern Mates™ display rug showing, for example, 105 different Pattern Mates™ heathered colors produced on a single textile substrate by a Millitron® jet dye machine by Milliken & Company of LaGrange, Ga.

Such a display carpet or rug may be used alone or in combination with additional selling tools such as individual samples of multiple colors or color shades to show the product. The size of the samples are preferably 27"×18", which is a standard sample size in the carpet industry, but not limited to this size. The sample carpet, rug, runner or blanket for these individual samples will preferably have more than one color or color shade in a rectangular array or other format across the sample or in the width of the sample. For example, FIGS. 11B, 13, 18, and 19 show color display rugs or samples having multiple colors, coordinating colors, contrasting colors, and/or shades of one color or hue. This gives the ability to show a lot of color in just a few samples. The problem has always been too many samples. This will relieve the need for many samples. For example, if each sample carpet or rug shows 6 colors from individual color families, then with 20 samples you will show a total of 120 colors instead of only 20 . The patchwork type format can be used for both large floor or wall sample rugs and smaller individual sample rugs.

Production of these color sample rugs or carpets is facilitated by the ability to dye multiple and different colors in squares or any shapes on one individual textile base or continuous textile base. This includes, but is not limited to dyeing or printing on broadloom carpeting of any width, area rugs, mats, accent rugs, runners, and carpet tiles of any size and shape. Colors can be organized in any scheme from families in color palettes, coordinating colors, to collections of unrelated colors in any shape or size.

For example, a large display rug having 20 major colors or hues thereon may be used along with 20 different smaller sample rugs each having 4 different shades of one respective major color or hue thereon. The large display and small sample rugs may be tufted, bonded, woven, knitted, non-woven, or the like and may have a non-skid or cushion backing thereon. Further, the face may be carved, sculpted, cut pile, loop pile, textured, and/or the like. The large display rug and smaller sample rugs may form a marketing system and may be formed by printing or dyeing broadloom carpet, and then cutting out the large and small rugs. The rugs may be cut out by hand, die cut, ultrasonic cut, laser cut, water jet cut, scissor cut, blade cut, hot knife cut, in-line saw cut, rotary knife cut, machine cut, or the like. The cut rugs may also be edge treated, edge trimmed, sheared, fringed, surged, capped, sewn, binded, sealed, seared, edged, matted, beveled, or the like. The products being displayed may be broadloom carpet, carpet tiles, mats, rugs, runners, area rugs, wall covering, surface covering, or the like for the residential, commercial, industrial, institutional, or hospitality markets. Such display rugs, color family rugs, patterned rugs, color area rugs, and/or the like facilitate and enhance the purchasing experience as well as provide the potential customer with more choices in color, pattern, design, shade, base construction, and/or the like. Hence, numerous floor covering or surface covering products or product lines may be displayed, marketed, merchandized, or sold in this manner.

Process A

1. Customer and/or Dealer submits Color Sample to Supplier and/or Dealer or Website.
2. Dealer and/or Supplier analyzes color sample and determines best matching and/or coordinating colors.
3. Supplier manufactures Color Selection Blanket, Color Family Blanket, and/or Product Samples and direct ships to Customer and/or Dealer.
4. Dealer and/or Supplier provides electronic, paper copy and/or textile Color Blanket and/or Color Family Blanket and/or Product Sample to Customer.
5. Customer and/or Dealer orders products, samples and/or additional Color Selection Blankets, and/or Color Family Blankets.
6. Customer and/or Dealer orders Products and/or Product Samples.
7. Customer and/or Dealer orders Products.
8. Products and/or Product Samples manufactured by Supplier and direct shipped to Customer and/or Dealer.

Process B

1. Customer goes on-line, to Dealer, and/or to Retailer and looks at Product Samples, Products, Color Selection Blankets, and/or Color Family Blankets.
2. Customer, Dealer and/or Retailer downloads or prints out Samples, Color Selection Blanket, and/or Color Family Blanket.
3. Customer takes Sample, Color Selection Blanket, and/or Color Family Blanket home.
4. Customer, Dealer and/or Retailer orders one or more Products, Product Samples, Color Selection Blankets, and/or Color Family Blankets from Dealer, Retailer and/or Supplier.
5. Supplier manufactures Products, Product Samples, Color Selection Blankets, and/or Color Family Blankets and direct ships to Customer, Dealer and/or Retailer.
6. Customer takes Sample, Color Selection Blanket, and/or Color Family Blanket home.
7. Customer, Dealer and/or Retailer orders one or more Products, Samples, Color Selection Blankets, and/or Color Family Blankets from Dealer, Retailer and/or Supplier.
8. Customer, Dealer and/or Retailer orders Products and/or Samples.
9. Customer orders Products and/or Product Samples from Dealer, Retailer and/or Suppler.
10. Customer orders Products from Dealer, Retailer and/or Supplier.
11. Products and/or Product Samples manufactured and direct shipped to Customer, Dealer and/or Retailer.

FIG. 20 shows a large color selection (product line) display carpet, rug, blanket or the like. Such a carpet or rug can be used as any other carpet or rug. Preferably, such a carpet or rug is used to advertise, market or display the available colors or patterns in a particular product line, such as residential, commercial, institutional, or hospitality broadloom carpet.

In accordance with a particular example and as shown in FIG. 20, the display carpet or rug has over 100 different colors (heathers) jet dyed on a high twist yarn cut pile (frieze) broadloom carpet base (38 oz./yd$^2$ face weight).

FIGS. 21–23 show how a particular heather patterned carpet product can coordinate or match with one or more other flooring products. A heather pattern with two or more colors or shades is preferred and with three or more colors or shades is more preferred. FIGS. 21 and 22 show different pieces of ceramic tile coordinating with a multi-colored cut pile carpet. FIG. 23 shows ceramic tile and a laminate or vinyl tile coordinating with a multi-colored cut pile carpet.

FIG. 24 shows a large piece of pattern carpet coordinating with several selections of different multi-colored (heather patterned) cut pile carpet pieces or samples (blue, red, rose, etc.).

FIG. 25 shows different ceramic, vinyl or laminate tile pieces coordinating with several different multi-colored (heather patterned) carpet samples or pieces.

FIG. 26 shows a vinyl or laminate self-stick tile coordinating with several multi-colored (heathered) carpet samples.

FIG. 27 shows two ceramic tiles coordinating with several different multi-colored (heathered) carpet samples or pieces.

It has been discovered that a multi-colored twist yarn carpet can be coordinated with pattern carpet, carpet tiles, ceramic tiles, laminate, vinyl, other flooring, room decor, furnishings, drapery, and the like. The heather or multi-colors of a twist yarn carpet can be coordinated with the colors of pattern carpet. The twist yarn carpet substrate can be all white (undyed), precolored, postcolored, or spaced dyed with an overflow applicator and then printed or dyed to provide the multi-color pattern or heather. The multi-colored carpet can be tufted, woven, hand gunned, hand made, or the like. Preferably, the multi-colored twist yarn carpet has up to three or more colors of metapixel blending per single end of fiber to give very different colors. The high turn twist carpet is preferably finished in 6', 12' or 13'6" wide carpets. The multi-color twist carpet color coordinates with pattern carpets, ceramic tile, laminate, and/or vinyl made up of various designs, figurative, contemporary, eclectic, geometric, or any other of such designs. Examples of such designs include floral, ornamental, speckled, heathers, and subtle. For example, the color coordination is between a pattern carpet, ceramic tile, laminate, and/or vinyl being installed in one room or area of a house and the multi-colored twist carpet being installed in another. Thus, complementing the interior design of the rooms.

With reference to FIGS. 11A, 11B, 36, and 37 of the drawings, a display system as shown in FIG. 37 is made up of a display rug (such as shown in either FIG. 11A or 11B) and a display cover shown in FIG. 36. The display system of FIG. 37 is preferably presented in a vertical or near vertical orientation and labels or identifying information is provided adjacent each different color area to provide the customer, potential customer, system user with ready access to the information needed to select and order the desired color, pattern, base, or the like. The respective identifying information is preferably included in each of the elongated rectangular boxes above each of the color area windows.

If desired, the display cover may be hinged to provide access to the underlying display rug to, for example, allow the rug to be changed out, to be viewed uncovered, to be taken near a window to see it in sun light or the like.

It is preferred that the transparent material of the display cover be a solid sheet of transparent plastic, acrylic, Lucite, plexiglass, glass or the like. The frame or borders of the display cover may be separate from or attached to the transparent sheet. It is preferred that the borders or frames of the display cover be over top of the transparent sheet.

The display system of the present invention may display one or more colors, patterns, bases, or the like, preferably two or more, more preferably 4 or more and may be any size or shape.

With reference to FIG. 38, the display rug may include non-contiguous color or pattern areas separated by, for example, a white or light background (such as off white, light beige, or the like). Also, the color or pattern areas may be of any shape such as circular.

With reference to FIG. 39, the display rug may include contiguous bands, strips, or the like of different colors or patterns across its width (or down its length or at any angle across its face).

With reference to FIGS. 40–42, a display system includes a plurality of color family or color palette display rugs or articles, each having a plurality of color (or shades) areas thereon, and can be used to market solid or heather colored broadloom carpet and to allow a customer or user to coordinate or match the carpet to other flooring, wall covering, furnishings, pattern carpet, or the like.

In accordance with one particular residential broadloom carpet example, a total of 270 different colors are displayed on 18 different color family samples or rugs each having 15 different colors thereon. Also, the customer, dealer, retailer, or potential customer can select from different bases (for example, three or more different bases, such as cut pile, loop pile, textured, and/or the like). For example, they may be able to choose from five different carpet constructions or bases, such as, 32 oz. (yarn face weight) textured Saxony, 40 oz. straight set Saxony, 38 oz. frieze, 55 oz. frieze, or 42 oz. textured loop. For example, residential broadloom carpet sold by Milliken & Company of LaGrange, Ga., under the tradenames Bastion, Lamprey, Concord, Verde, and Assabet. This gives the customer at least 1,350 different choices (base and color) in a residential broadloom carpet. By adding frames, borders, inlays, or the like, there are over 2,000 choices or combinations.

If a customer or potential customer is unsure of a particular choice of base and color, they may order a sample of the particular color and base (for example, a 9 inch square or 18 inch square piece of carpet, an 18 inch×24 inch rectangle, or the like) or they may order a color family sample or rug of the selected base and having the selected color along with related or coordinating colors (for example, the selected color and 14 other related colors (color family) on the selected base in an 18 inch×24 inch sample).

In accordance with one particular example of the present invention, each color family sample rug for display purposes at a store, dealer, retailer, or the like such as Carpet One, Home Depot, Lowe's, or the like, has 15 different colors, patterns, designs, or shades thereon, is about 24 inches wide×40 inches long, with each of the 15 different colors or the like defining an about 8 inch×8 inch square area, with each of the 15 color areas being contiguous, the base being, for example, one of cut and/or loop pile tufted, bonded, woven, knitted, flocked, or the like, and with the color, pattern, designs, textures, or shades preferably being produced in broadloom form by one of dyeing, printing, tufting, weaving, painting, and/or the like, most preferably dyeing or printing and even more preferably jet dyeing.

In accordance with another particular example, 240 total different carpet colors are displayed on 2 color family or color selection samples or rugs, each having 120 different colors thereon in relatively small contiguous rectangular areas. Also, each color is available on one or more bases, for example, one of 5 different bases, such as, 32 oz. (face yarn weight) textured Saxony, 40 oz. straight set Saxony, 38 oz. frieze, 55 oz. frieze, or 42 oz. textured loop. This provides the customer or potential customer with 1,200 different choices (base and color).

In accordance with a preferred embodiment, customers, dealers, retailers, stores, distributors, or the like can order color samples, color family samples, color family rugs, carpet tiles, rugs, carpets, runners, broadloom, and/or the like with no minimum order and direct shipment in either 24 hours, 3 days or 7 days from placing the order (depending on the base, color, pattern, texture, finish, inventory, special order, or the like). In accordance with the preferred embodiment, the customer either takes the desired product (base and color, color sample, color family sample, and/or the like) from inventory or makes an order (special or custom order) for the desired sample or product. It is preferred that the product or sample be produced on demand (when ordered) to eliminate or at least reduce inventory, can be printed, dyed, tufted, or the like in broadloom form, cut to shape, size or length, and then direct shipped to the customer, store, etc.

It should be understood that the specifics of the construction of the textile substrates in the above examples are not critical. The patterning techniques disclosed herein are applicable to a variety of absorbent textile substrates, including, but not limited to, carpets, carpet tiles, rugs, and mats having the widest variety of constructions, so long as each has sufficient dimensional stability for acceptable transport and pattern transfer and the face yarns are capable of accepting dye in an acceptable manner.

While the invention has been described in connection with the embodiments discussed above, it is not intended to limit the scope of the invention to the particular form set forth, but on the contrary, it is intended to cover such alternatives, modifications, and equivalents as may be included within the spirit and scope of the invention as defined by the appended claims.

We claim:

1. A textile substrate for coordinating with other flooring, furnishings, pattern goods, or the like, having one or more patterns, colors or shades thereon produced by a process including the steps of constructing a superpixel to be replicated on the surface of the substrate, said superpixel being comprised of a plurality of contiguous pixels that collectively provide said superpixel with a geometric shape that can be tiled on said substrate surface, each of said plurality of contiguous pixels comprising said superpixel being assigned a color from a dither palette in a relative proportion to simulate a target color, wherein at least two different colors are individually assigned within said superpixel in accordance with a placement algorithm that precludes the assignment of the same color on adjacent pixels within said superpixel, and applying said colors to the surface of the substrate by tiling said superpixel in a repeating manner across the surface of the substrate such that on the surface of the substrate no adjacent pixels have the same color, wherein said substrate is one of a display or sample carpet or rug, and comprising a plurality of shades, colors or patterns of a color or product line on a single carpet or rug substrate for display as a selling tool.

2. The substrate of claim 1, wherein the plurality of shades, colors or patterns of the substrate are adapted to coordinate with at least one of pattern carpet, carpet tiles, ceramic tiles, laminate, vinyl, other flooring, room decor, furnishings, drapery, or combinations thereof.

3. The substrate of claim 1, wherein the plurality of shades, colors, or patterns of the substrate are adapted to coordinate with at least one of ceramic, laminate, and vinyl tiles.

4. The substrate of claim 1, further comprising a plurality of color or pattern codes or designations on the substrate.

5. The substrate of claim 1, wherein each of the plurality of shades, colors or patterns of the substrate has its own unique color or pattern code or designation.

6. The substrate of claim 1, wherein at least 3 different colors or shades make up each of the plurality of shades, colors or patterns.

7. The substrate of claim 1, wherein the substrate represents broadloom carpet which coordinates with other flooring.

8. A display substrate having at least four areas of different patterns, colors or shades produced by a process including the steps of constructing a superpixel to be replicated on the surface of the substrate, said superpixel being comprised of an N ×N array of pixels, each of said pixels having been assigned a color from a dither palette in a relative proportion to simulate a target color, wherein said colors are assigned within said superpixel in accordance with a placement algorithm that assigns a given color to a pixel in each of the N rows and each of the N columns in a manner that said given color is found no more than once in any row or column in said array and each pixel assigned to said given color is surrounded by pixels to which other colors have been assigned; and applying said target color to the surface of the substrate by applying said superpixel in a repeating arrangement across the surface of the substrate such that on the surface of the substrate said given color is present no more than once in any row or column in said superpixel and on the surface of the substrate each pixel assigned to said given color is surrounded by pixels to which other colors have been assigned, wherein said substrate includes at least 4 of said areas of different patterns, colors, or shades, and wherein said substrate is one of a display or sample rug or carpet, and comprising a plurality of shades, colors or patterns of a color or product line on a single carpet or rug substrate for display as a selling tool.

9. The substrate of claim 8, where N is at least 4.

10. A display substrate having at least two areas of different patterns, colors or shades produced by a process including the steps of constructing a superpixel to be replicated on the surface of the substrate, said superpixel being comprised of an N ×N array of pixels, each of said pixels having been assigned a color from a dither palette in a relative proportion to simulate a target color, wherein said colors are assigned within said superpixel in accordance with a placement algorithm that assigns a given color to a pixel in each of the N rows and each of the N columns in a manner that said given color is found no more than once in any row or column in said array and each pixel assigned to said given color is surrounded by pixels to which other colors have been assigned: and applying said target color to the surface of the substrate by applying said superpixel in a repeating arrangement across the surface of the substrate such that on the surface of the substrate said given color is present no more than once in any row or column in said superpixel and on the surface of the substrate each pixel assigned to said given color is surrounded by pixels to which other colors have been assigned, wherein said substrate includes at least two of said areas of different patterns, colors, or shades, wherein said substrate forms part of a display system, and comprising a plurality of shades, colors or patterns of a color or product line on a single carpet or rug substrate for display as a selling tool.

11. The substrate of claim 10, wherein each of said areas of different patterns, colors, or shades is contiguous.

12. The substrate of claim 11, wherein said substrate is a high twist, jet dyed cut pile carpet.

13. The substrate of claim 10, wherein N is at least 4.

* * * * *